United States Patent
Kawada et al.

(10) Patent No.: US 8,112,598 B2
(45) Date of Patent: Feb. 7, 2012

(54) APPARATUS AND METHOD FOR CONTROLLING COPYING

(75) Inventors: Takashi Kawada, Kawasaki (JP);
Hirotomo Tokoro, Kawasaki (JP);
Yoshinari Shinozaki, Kawasaki (JP);
Koji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 12/372,889

(22) Filed: Feb. 18, 2009

(65) Prior Publication Data

US 2009/0249010 A1    Oct. 1, 2009

(30) Foreign Application Priority Data

Mar. 27, 2008  (JP) ................... 2008-084665

(51) Int. Cl.
*G06F 12/00*  (2006.01)

(52) U.S. Cl. ........... 711/162; 711/161; 711/E12.001; 711/E12.103; 707/639; 707/649

(58) Field of Classification Search .......... 711/161–162, 711/E12.001, E12.103; 707/639, 640, 649
See application file for complete search history.

(56) References Cited

U.S. PATENT DOCUMENTS

| | | | | |
|---|---|---|---|---|
| 6,658,434 | B1 * | 12/2003 | Watanabe et al. | ............. 707/202 |
| 7,174,438 | B2 | 2/2007 | Homma et al. | |
| 7,197,615 | B2 | 3/2007 | Arakawa et al. | |
| 7,287,045 | B2 | 10/2007 | Saika et al. | |
| 2004/0193945 | A1 | 9/2004 | Eguchi et al. | |
| 2004/0260966 | A1 | 12/2004 | Kaiya et al. | |
| 2006/0129773 | A1 * | 6/2006 | Watanabe et al. | ............. 711/162 |
| 2006/0212625 | A1 | 9/2006 | Nakagawa et al. | |
| 2007/0067585 | A1 | 3/2007 | Ueda et al. | |
| 2007/0143554 | A1 | 6/2007 | Uchida et al. | |
| 2007/0294495 | A1 | 12/2007 | Uchida et al. | |

FOREIGN PATENT DOCUMENTS

| | | |
|---|---|---|
| JP | 07-219829 | 8/1995 |
| JP | 2001-061124 | 3/2001 |
| JP | 2001-216185 | 8/2001 |
| JP | 2004-252686 | 9/2004 |
| JP | 2004-287648 | 10/2004 |
| JP | 2005-284609 | 10/2005 |
| JP | 2005-301628 | 10/2005 |
| JP | 2006-23889 | 1/2006 |
| JP | 2006-164162 | 6/2006 |

(Continued)

OTHER PUBLICATIONS

Japanese Office Action issued Feb. 23, 2010 in corresponding Japanese Patent Application 2008-084665.

(Continued)

*Primary Examiner* — Jasmine Song
(74) *Attorney, Agent, or Firm* — Staas & Halsey LLP

(57) ABSTRACT

Pre-update data is copied from a first storage device onto a second storage device in response to an update instruction to update data on the backup target volume on the first storage device. A copy status of each data on the backup target volume is managed with position information of the data mapped thereto. If bad data is present in the data on the backup target volume, the position information indicating the position of the bad data is searched. In accordance with the copy status managed with the position information mapped thereto, it is determined whether the pre-update data of the bad data is stored on the second storage device.

6 Claims, 17 Drawing Sheets

FOREIGN PATENT DOCUMENTS

| | | |
|---|---|---|
| JP | 2006-259962 | 9/2006 |
| JP | 2006-260376 | 9/2006 |
| JP | 2007-87036 | 4/2007 |
| JP | 2007-172082 | 7/2007 |
| JP | 2007-265441 | 10/2007 |
| JP | 2007-334709 | 12/2007 |

OTHER PUBLICATIONS

Japanese Office Action for corresponding Japanese Application 2008-084665; mailed Jun. 8, 2010.

* cited by examiner

FIG.3A

| 1 | 2 | 3 |
|---|---|---|
| 4 | 5 | 6 |
| 7 | 8 | 9 |

FIG.3B

| COPY SOURCE LU NUMBER | SESSION NUMBER | BITMAP |
|---|---|---|
| ⋮ | ⋮ | ⋮ |
| 2 | 10 | <table><tr><td>1</td><td>0</td><td>1</td></tr><tr><td>1</td><td>1</td><td>1</td></tr><tr><td>1</td><td>1</td><td>0</td></tr></table> |
| ⋮ | ⋮ | ⋮ |

FIG.4

| COPY SOURCE LU NUMBER | COPY TYPE |
|---|---|
| 0 | SNAP OPC |
| 1 | SNAP OPC |
| ⋮ | ⋮ |

FIG.5

| COPY SOURCE LU NUMBER | CONFIGURATION TABLE NUMBER | BAD DATA PRESENCE IDENTIFICATION INFORMATION | BAD DATA LBA ADDRESS | BAD DATA LBA SIZE |
|---|---|---|---|---|
| 1 | 0 | 1 | 0X0000000000007000 | 0X0000000000000010 |
| | 1 | 1 | 0X0000000000008800 | 0X0000000000000020 |
| | 2 | 0 | 0X0000000000000000 | 0X0000000000000000 |
| | 3 | 0 | 0X0000000000000000 | 0X0000000000000000 |
| | ---- | ---- | ---- | ---- |
| 2 | 0 | 1 | 0X0000000000001111 | 0X0000000000004444 |
| | 1 | 1 | 0X0000000000002222 | 0X0000000000005555 |
| | 2 | 1 | 0X0000000000003333 | 0X0000000000006666 |
| | 3 | 0 | 0X0000000000004444 | 0X0000000000000000 |
| | ---- | ---- | ---- | ---- |

FIG.9

| FILE | EDIT | VIEW | GO | BOOKMARKS | TOOLS | WINDOWS | HELP |

DETERMINATION RESULT OF BAD DATA RESTORABILITY

| SESSION NUMBER | COPY SOURCE LU NUMBER | BAD DATA LBA ADDRESS | BAD DATA LBA SIZE | PARTIAL RESTORABILITY | ALL RESTORABILITY |
|---|---|---|---|---|---|
| 10 | 0 | 0X0000000000007000 | 0X0000000000000010 | RESTORE IS POSSIBLE | RESTORE IS NOT POSSIBLE |
| 10 | 0 | 0X0000000000008800 | 0X0000000000000020 | RESTORE IS NOT POSSIBLE | |
| 14 | 1 | 0X0000000000001111 | 0X0000000000004444 | RESTORE IS POSSIBLE | RESTORE IS POSSIBLE |
| 14 | 1 | 0X0000000000002222 | 0X0000000000005555 | RESTORE IS POSSIBLE | |
| 14 | 1 | 0X0000000000003333 | 0X0000000000006666 | RESTORE IS POSSIBLE | |

FIG.10

| FILE EDIT VIEW GO BOOKMARKS TOOLS WINDOWS HELP |||||
|---|---|---|---|---|
| BAD DATA RESTORABILITY DETERMINATION |||||
| SESSION NUMBER | COPY SOURCE LU NUMBER | BAD DATA LBA ADDRESS | BAD DATA LBA SIZE ||
| 10 | 0 | 0X0000000000007000 | 0X0000000000000010 ||
| EXECUTING/ CANCELING SELECTED OPERATION? |||||
| | | OK | CANCEL | |

APPARATUS AND METHOD FOR CONTROLLING COPYING

CROSS-REFERENCE TO RELATED APPLICATION

This application is based upon and claims the benefit of priority of the prior Japanese Patent Application No. 2008-84665, filed on Mar. 27, 2008, the entire contents of which are incorporated herein by reference.

FIELD

A certain aspect of the embodiments discussed herein is related to an apparatus and method for controlling copying.

BACKGROUND

Snap one point copy (SnapOPC) is known as one of backup techniques of a backup target volume in the field of storage products. SnapOPC is to produce a snapshot, i.e., data on the backup target volume at a given time (containing no update subsequent to the given time). More specifically, SnapOPC is a technique of backing up only data prior to an updating process at a location where the updating process is performed (as disclosed in Japanese Laid-open Patent Publication No. 2007-172082).

The above-described known technique cannot learn whether bad data (data unreadable) has a backup.

More specifically, SnapOPC stores only pre-update data at a location having undergone an update process instead of storing all the data on a backup target volume at a given time. In accordance with SnapOPC, bad data is not necessarily backed up. To learn whether the bad data is backed up or not, an engineer having provided service to storage products needs to be accessed for inquiry.

SUMMARY

According to an aspect of the invention, an apparatus for controlling copying includes a copy unit for receiving update instruction of data on backup target volume in a first storage device, and copying pre-update data on the backup target volume in the first storage device into a second storage device on the basis of the update instruction, a management table configured to relate a copy status with position information indicating a position of the data in the backup target volume, the copy status indicating whether the pre-update data indicated by the position information is copied into the second storage device by the copy unit, and a data determiner for searching the position information indicating the position of bad data indicating unreadable data by the management table upon the bad data being present in the backup target volume, and determining whether the pre-update data corresponding to the bad data is stored in the second storage device on the basis of the copy status related with the position information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 3A and 3B illustrate a bitmap table in accordance with the first embodiment;

FIG. 4 illustrates a copy control session manager in accordance with the first embodiment;

FIG. 5 illustrates a configuration table in accordance with the first embodiment;

FIG. 9 illustrates the restore controller in accordance with the first embodiment;

FIG. 10 illustrates the restore controller in accordance with the first embodiment;

DESCRIPTION OF EMBODIMENTS

An apparatus, method, and computer program for controlling copying in accordance with embodiments of the present technique are described in detail below with reference to the drawings. A disk array apparatus is described below as the copy control apparatus having a storage device. Main terms used in the discussion of the disk array apparatus of a first embodiment, and the summary, features, structure, and process of the disk array apparatus are described in that order followed by the discussion of other embodiments.

First Embodiment

Terms

The main terms used in the discussion of the disk array apparatus of the first embodiment are described. A "copy source logical unit (LU)" as an example of a first storage device is a storage device on which data on a backup target volume is stored. A "copy destination LU" as an example of a second storage device is a storage device on which backup data is stored. More specifically, the copy destination LU stores each snapshot (a pre-update version of data that has been updated).

"Position information" indicates the position of the data within the backup target volume. In the embodiments to be discussed below, the "position information" used in a bitmap table is attached to each of a plurality of regions into which a data area is partitioned. For example, in the first embodiment, the "position information" used in a bitmap table are indicated as "No. 1", "No. 2", etc. Data at a position indicated by "position information No. 1" is simply referred to as "data indicated by position information No. 1."

In the first embodiment, the position information indicating bad data includes a start address of the bad data (bad data logical block addressing (LBA)) and a size throughout which the bad data continues starting with the start address (referred to as a bad data size). b The relationship between the "position information" used in the bitmap table and the position information of indicating the position of the bad data is briefly discussed. The bad data represented by the "bad data LBA" and the "bad data LBA size" is contained in any region to which the "position information" used in a bitmap table 401 is attached to.

(Summary of the Disk Array Apparatus)

Figure 1A:
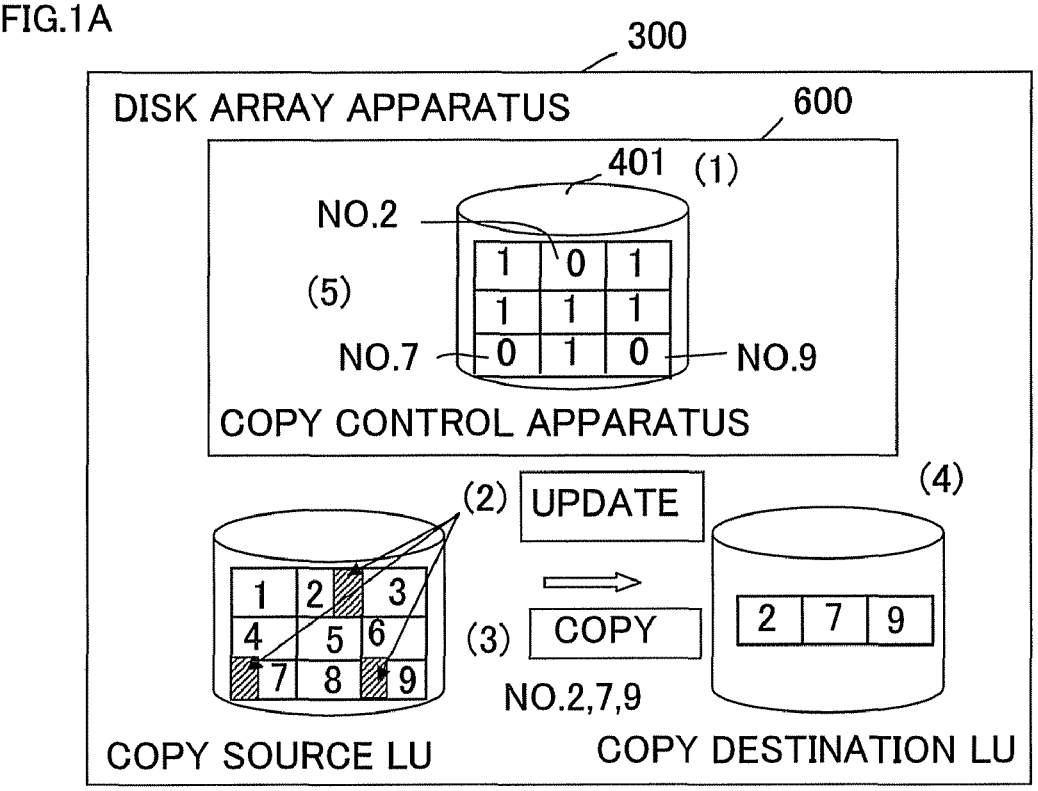
FIGS. 1A and 1B diagrammatically illustrate a disk array apparatus in accordance with a first embodiment.
Figure 1B:
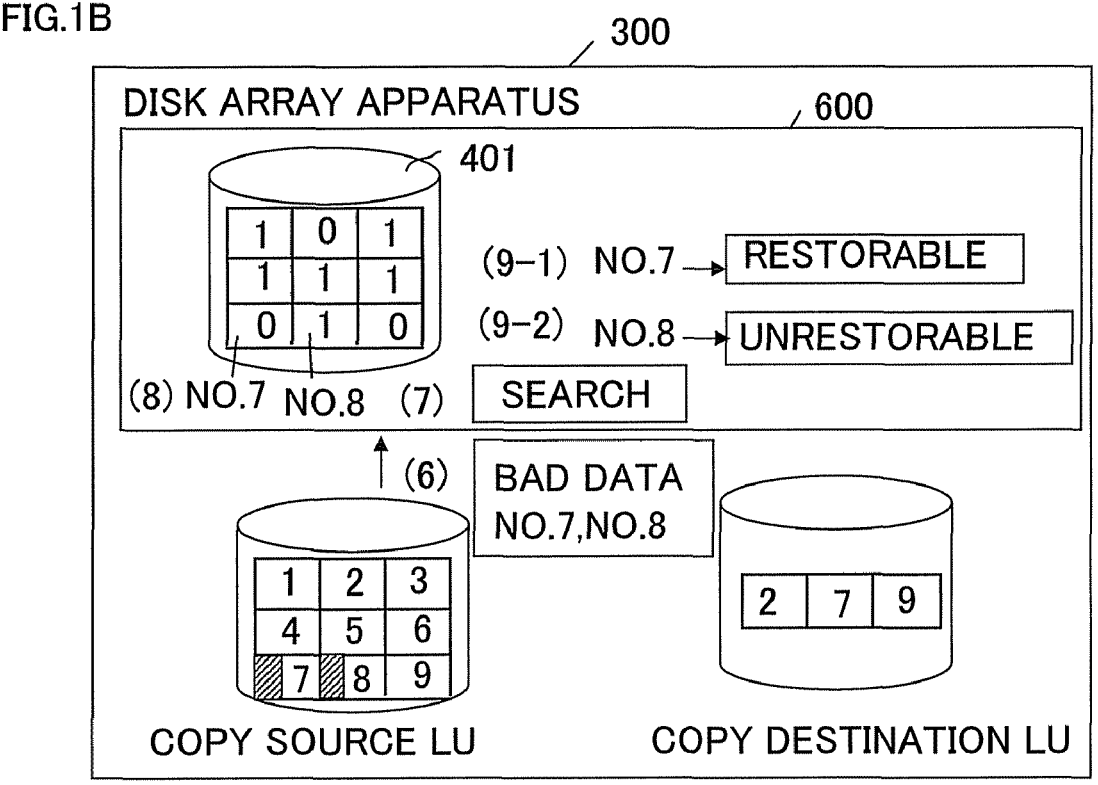

The disk array apparatus 300 of the first embodiment is summarized with reference to FIGS. 1A and 1B. FIGS. 1A and 1B illustrate the disk array apparatus 300 of the first embodiment.

The disk array apparatus 300 of the first embodiment includes a copy source LU, a copy destination LU, and a copy control apparatus 600 executing a backup process. The copy control apparatus 600 includes a bitmap table 401 managing a backup status (copy status) as an example of a management table.

The bitmap table 401 manages mapping of position information to a copy status on each data unit on the backup target volume. The copy status is information representing whether pre-update data (data present prior to updating indicated by the position information about a location where an update process has been performed) is copied.

With reference to step (1) in FIG. 1A, the bitmap table 401 manages the copy status, thereby storing "0" if the pre-update data is stored, and "1" if the pre-update data is not stored with the position information mapped thereto.

The copy control apparatus 600 of the first embodiment copies the pre-update data onto the copy destination LU if the data on the backup target volume stored on the copy source LU is updated. More specifically, the copy control apparatus 600 of the first embodiment copies the pre-update data onto the copy destination LU in response to an instruction to update the data on the backup target volume.

As illustrated in step (2) in FIG. 1A, an update process has been performed on position information "No. 2," "No. 7," and "No. 9" in the copy source LU. For example, the copy control apparatus 600 of the first embodiment copies each of the pre-update data represented by the position information "No. 2," "No. 7," and "No. 9" as in step (3) in FIG. 1A. The copy control apparatus 600 of the first embodiment stores the copied position information "No. 2," "No. 7," and "No. 9" onto the copy destination LU as illustrated in step (4) in FIG. 1A.

The copy control apparatus 600 of the first embodiment manages the copy status using the bitmap table as represented in step (5) in FIG. 1A. For example, in step (5), the bitmap table 401 stores "0" with the position information "No. 2," "No. 7," and "No. 9" having undergone the update process mapped thereto.

The disk array apparatus 300 of the first embodiment allows the user to recognize easily whether the bad data as unreadable data is backed up.

As illustrated in FIG. 1B, the copy control apparatus 600 of the first embodiment determines in accordance with the bitmap table whether the data mapped to the position information indicating the bad data is backed up.

For example, the copy control apparatus 600 of the first embodiment searches the bitmap table for the position information indicating the position of the bad data when the bad data is present in data on the backup target volume. More specifically, in step (6) in FIG. 1B, the bad data is contained in the data represented by the position information "No. 7," and "No. 8." In step (7) in FIG. 1B, the copy control apparatus 600 of the first embodiment searches the bitmap table for the position information "No. 7," and "No. 8."

The copy control apparatus 600 of the first embodiment determines in accordance with the copy status managed with the position information mapped thereto whether the pre-update data of the bad data is stored on the copy destination LU. More specifically, in step (8) in FIG. 1B, the bitmap table 401 stores "0" with the position information "No. 7" mapped thereto, and "1" with the position information "No. 8" mapped thereto. In step (9-1) in FIG. 1B, the copy control apparatus 600 of the first embodiment determines that the pre-update data mapped to the position information "No. 7" is present, and then that the bad data of the position information "No. 7" is restorable. In step (9-2) in FIG. 1B, the copy control apparatus 600 of the first embodiment determines that the pre-update data mapped to the position information "No. 8" is not present and that the bad data of the position information "No. 8" is not restorable.

The disk array apparatus 300 of the first embodiment can easily learn whether the bad data has the corresponding backup (pre-update data).

(Structure of Disk Array Apparatus)

Figure 2:
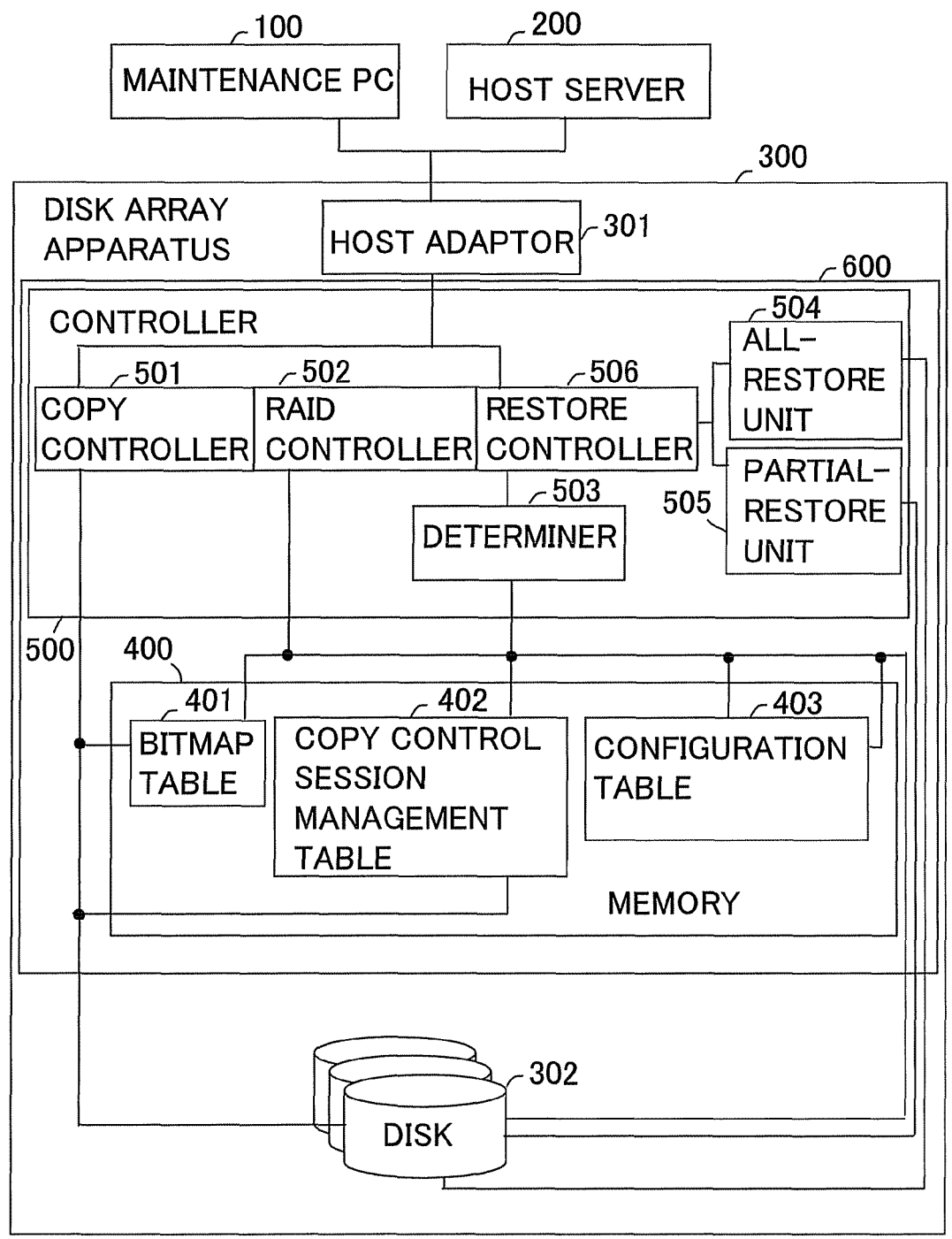
FIG. 2 is a block diagram illustrating the structure of the disk array apparatus in accordance with the first embodiment.

Referring to FIG. 2, the structure of a disk array apparatus 300 illustrated in FIGS. 1A and 1B is described below. A maintenance personal computer (PC) 100 and a host server 200 are briefly described first and then the structure of the disk array apparatus 300 is described.

Figure 6:
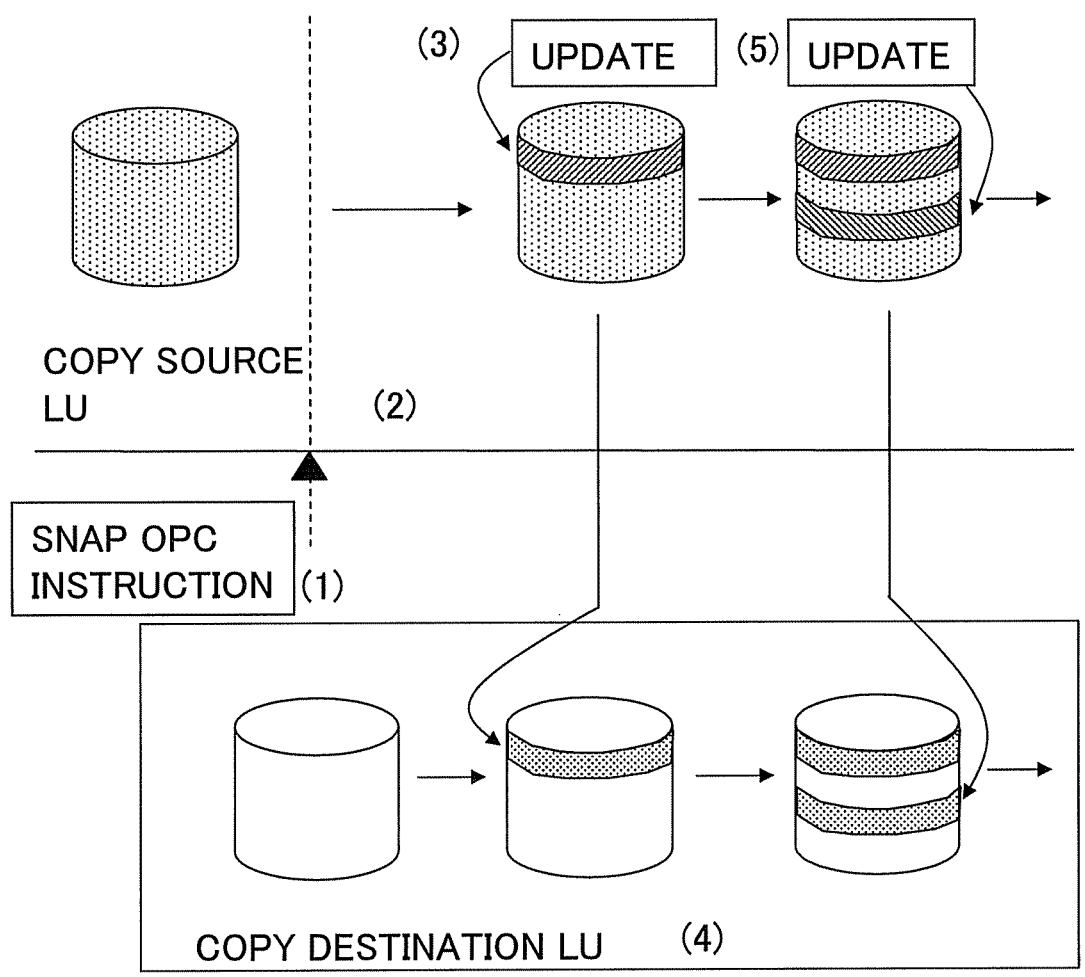
FIG. 6 illustrates a copy control apparatus in accordance with the first embodiment.
Figure 7A:
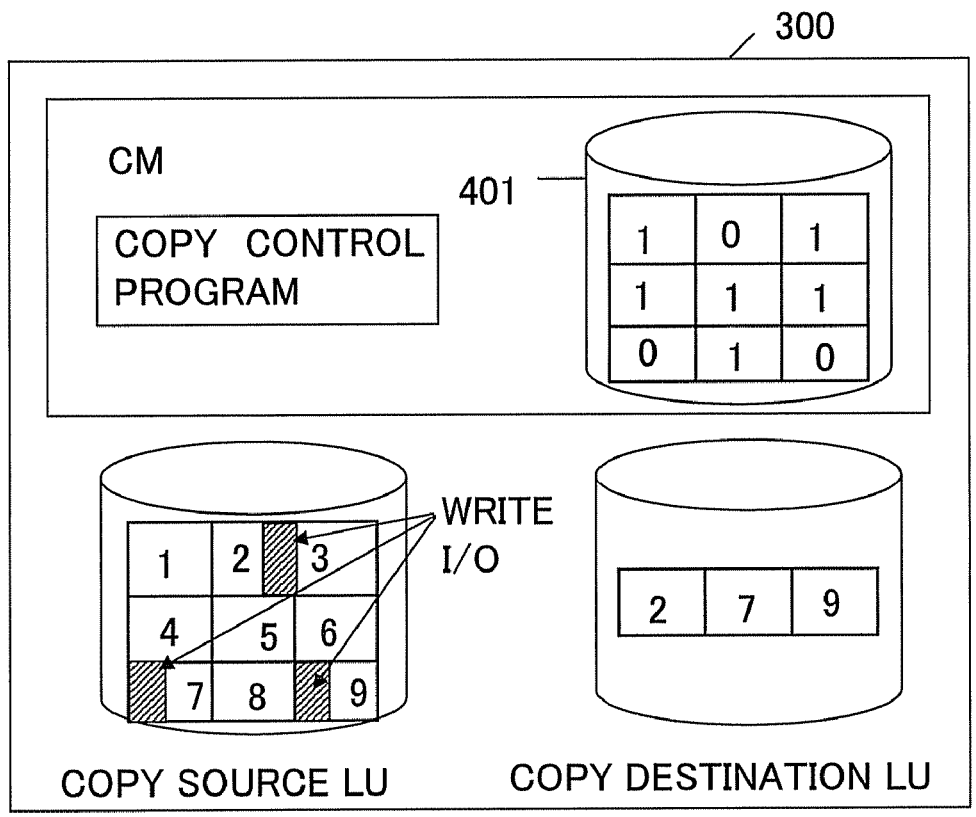
FIGS. 7A and 7B illustrate a determiner in accordance with the first embodiment.
Figure 7B:
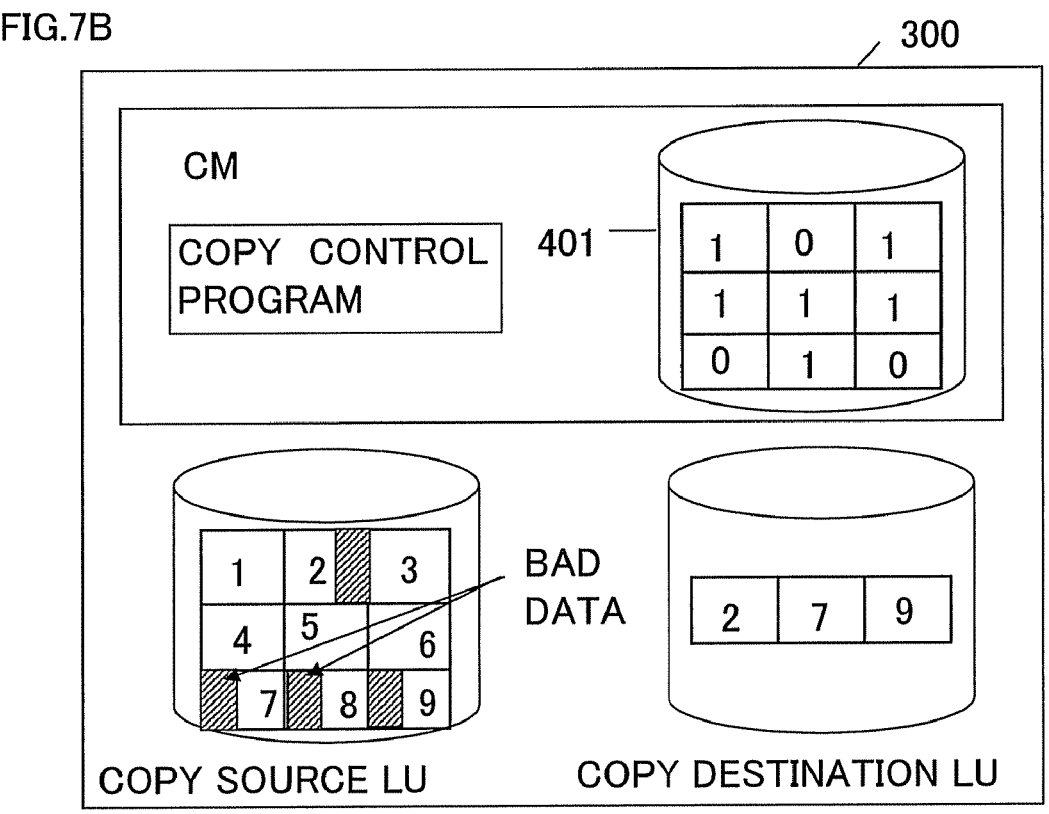
Figure 8:
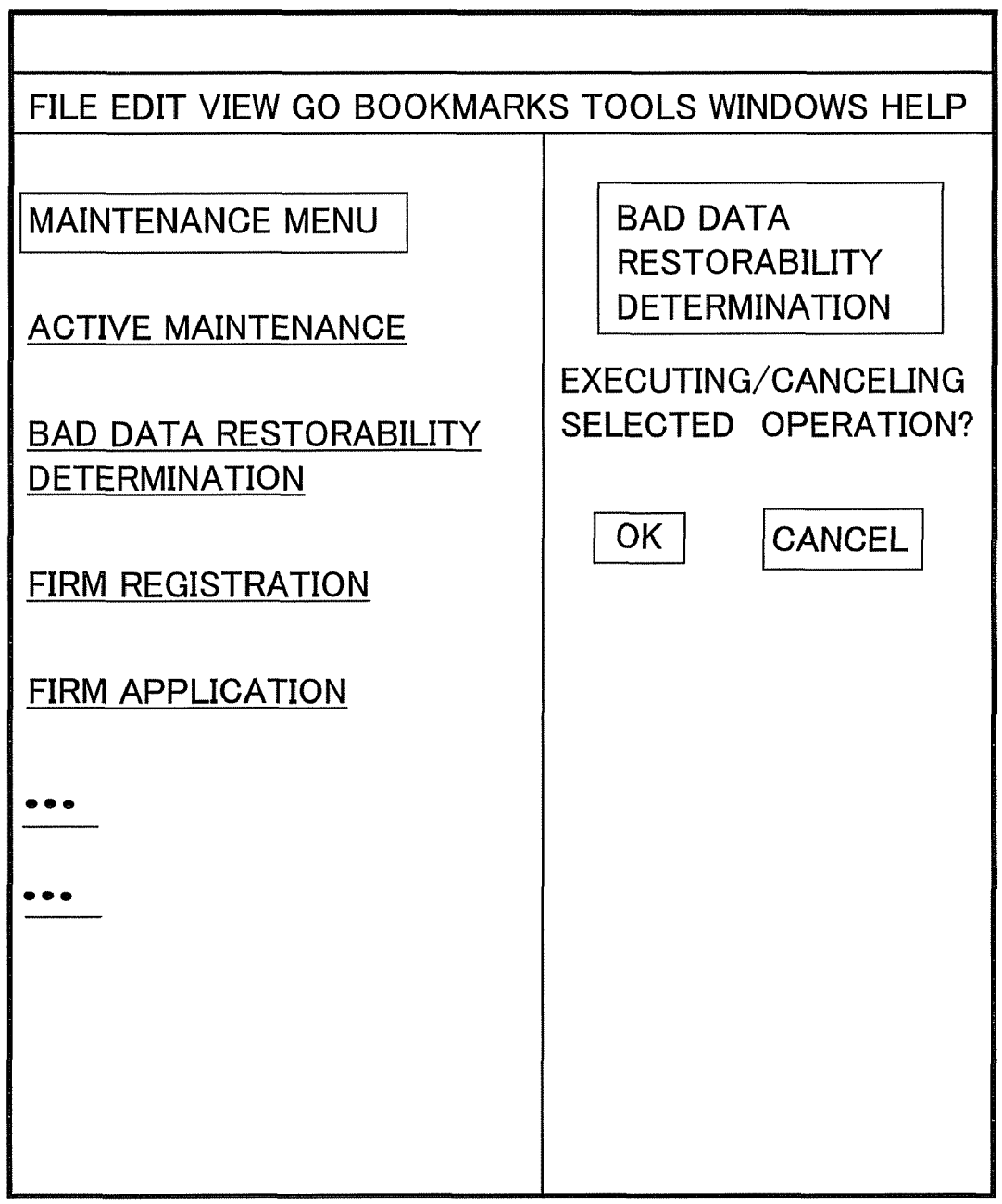
FIG. 8 illustrates a restore controller in accordance with the first embodiment.

FIG. 2 is a block diagram illustrating the structure of the disk array apparatus 300 in accordance with the first embodiment. FIGS. 3A and 3B illustrate the bitmap table of the first embodiment. FIG. 4 illustrates a copy control session manager in accordance with the first embodiment. FIG. 5 illustrates a configuration table in accordance with the first embodiment. FIG. 6 illustrates the copy control apparatus in accordance with the first embodiment. FIGS. 7A and 7B illustrate a determiner in accordance with the first embodiment. FIG. 8 illustrates a restore controller in accordance with the first embodiment. FIG. 9 illustrates the restore controller in accordance with the first embodiment. FIG. 10 illustrates the restore controller in accordance with the first embodiment.

Upon receiving an operation input from an user who operates the disk array apparatus 300, the maintenance PC 100 as an example of a management device relays the operation input to the disk array apparatus 300. As described more specifically below, the maintenance PC 100 transfers an instruction to request an operation screen, an instruction to determine restorability, and an instruction related to data restoration.

The maintenance PC 100 receives information from the disk array apparatus 300. More specifically, the maintenance PC 100 receives an operation screen receiving an operation input (maintenance screen), determination results (to be discussed later), and execution results (to be discussed later). The maintenance PC 100 includes a display (not shown). The display displays information (determination results from a determiner 503 to be discussed later) transmitted from the disk array apparatus 300.

For example, the maintenance PC 100 transfers the instruction to request the operation screen to the disk array apparatus 300. For example, upon receiving a maintenance operation login address from the user, the maintenance PC 100 requests a common gateway interface (CGI) program for the operation screen from the disk array apparatus 300 (a restore controller

506 to be discussed later). In other words, the maintenance PC 100 transfers the instruction requesting the operation screen.

The maintenance PC 100 expands the CGI program transmitted from the disk array apparatus 300 (restore controller 506) and displays on the display the operation screen receiving the operation input (maintenance screen as illustrated in FIG. 8).

For example, the user means a maintenance person who connects the disk array apparatus 300 to the maintenance PC 100 if the disk array apparatus 300 malfunctions, and performs a maintenance job using a utility program such as a maintenance CGI retrieved from the disk array apparatus 300 by the maintenance PC 100. More specifically, the user acquires related trouble and maintenance information from a maintenance menu via the CGI, and performs the maintenance job to a trouble in accordance with the trouble and maintenance information displayed on the display of the maintenance PC 100.

When the user inputs an operation to determine data restorability, the maintenance PC 100 transfers to the disk array apparatus 300 (restore controller 506) an instruction to determine restorability.

More specifically, the maintenance PC 100 transfers to the disk array apparatus 300 (restore controller 506) an instruction to determine the position information indicating the position of the bad data, a "copy source LU number," a "session number," and "position information." The maintenance PC 100 also transfers to the disk array apparatus 300 (restore controller 506) an instruction to perform a determination process on a per snapshot unit basis, the "copy source LU number," and the "session number."

Upon receiving determination results related to the restorability from the disk array apparatus 300 (such as a restorability table), the maintenance PC 100 displays the transferred determination results on the display thereof.

Upon receiving a request related to the data restoration from the user, the maintenance PC 100 transmits an instruction related to the data restoration to the disk array apparatus 300 (restore controller 506).

More specifically, when the user inputs an instruction to restore data on a per position information unit basis, and an instruction to restore data on a per snapshot unit basis, the maintenance PC 100 transfers these instructions to the disk array apparatus 300 (restore controller 506).

The maintenance PC 100 receives, as the instruction to restore data on a per position information unit basis, the "copy source LU number," the "session number," and the "position information" input by the user. The maintenance PC 100 then transfers the received "copy source LU number," "session number," and "position information" to the disk array apparatus 300 (restore controller 506). The maintenance PC 100 also receives, as the instruction to restore data on a per snapshot unit basis, the "copy source LU number," and the "session number" input by the user. The maintenance PC 100 then transfers the received "copy source LU number," and "session number" to the disk array apparatus 300 (restore controller 506).

The maintenance PC 100 displays execution results of the data restoration transferred from the disk array apparatus 300 (restore controller 506) via a host adaptor 301. The maintenance PC 100 may be connected to the disk array apparatus 300 via a connection port dedicated to the maintenance PC 100 rather than via the host adaptor 301.

The host server 200 transfers the data on the backup target volume, information for setting a copy type, and an update instruction to the disk array apparatus 300 (copy controller 501 to be discussed later).

The disk array apparatus 300 is connected to each of the maintenance PC 100 and the host server 200. The disk array apparatus 300 includes the host adaptor 301, a disk 302, a memory 400, and a controller 500. The copy control apparatus 600 includes the memory 400 and the controller 500.

The host adaptor 301, connected to an external device such as the host server 200, exchanges information with the external device. For example, the host adaptor 301, connected to the host server 200 via a fiber channel (FC) or the like, transfers information received from the host server 200 to the controller 500. The host adaptor 301 also transfers information received from the controller 500 to the host server 200.

The disk 302 includes a copy source LU and copy destination LU (not shown in FIG. 2) as will be described below. Information stored on the copy source LU and the copy destination LU of the disk 302 is used by the controller 500 (including a copy controller 501, an all-restore unit 504, and a partial-restore unit 505).

The disk 302 includes the copy source LU. More specifically, the disk 302 stores the data on the backup target volume on the copy source LU. The data on the backup target volume is the data that is transferred from the host server 200 to the disk array apparatus 300. The data on the backup target volume, transferred from the host server 200, and input via the controller 500, is stored onto the copy source LU of the disk 302.

In the discussion that follows, the disk 302 has a plurality of copy source LUs, and the plurality of copy source LUs store data of different backup target volumes.

The disk 302 also includes the copy destination LU. More specifically, the disk 302 stores backup data of the data on a backup target volume received from the controller 500 (copy controller 501) onto the copy destination LU.

In the disk array apparatus 300 of the first embodiment, the controller 500 (copy controller 501) generates a snapshot as the backup data at each time a backup operation is performed. The snapshot indicates the data on the backup target volume at the moment the backup operation is performed. For this reason, the disk 302 stores onto the copy destination LU the snapshot generated each time as the backup data.

The memory 400 stores data needed by the controller 500 in each of a variety of processes. The memory 400 includes, as elements closely related to the present technique, the bitmap table 401, the copy control session management table 402, and the configuration table 403.

The bitmap table 401 manages the position information and the copy status with one mapped to the other. More specifically, the bitmap table 401 manages the position information and the copy status on each data unit of the data on the backup target volume, with information regarding a time point at the execution of a backup operation mapped to the position information and the copy status.

In other words, the bitmap table 401 manages a "bitmap" in which the position information indicating each data unit of the data on the backup target volume is mapped to the copy status. The bitmap table 401 manages a bitmap for each time point of the execution of the backup operation.

When the copy status is managed, the bitmap table 401 stores "0" if the pre-update data is copied, and the bitmap table 401 stores "1" if the pre-update data is not copied.

Referring to FIG. 3A, the snapshots are mapped to nine pieces of position information of "No. 1" through "No. 9" in order to manage the copy status. As illustrated in FIG. 3B, the bitmap table 401 stores a bitmap with a combination of a "copy source LU number" identifying a backup target volume and a "session number" identifying a backup execution time point mapped to the bitmap. For example, the bitmap table

401 stores a bitmap of position information "1" and a copy status "1" with a combination of a copy source LU number "2" and a session number "10."

The bitmap table 401 manages stored information in response to a backup process performed by the controller 500 (copy controller 501). For example, when the controller 500 (copy controller 501) inputs the pre-update data to the copy destination LU of the disk 302, the bitmap table 401 changes from "1" to "0" the copy status mapped to the position information of the pre-update data.

The information stored on the bitmap table 401 is used by the controller 500 (determiner 503).

A copy control session management table 402 manages a copy type of each of the copy source LU as illustrated in FIG. 4. The copy type corresponds to a "SnapOPC" indicating a method of backing up only the pre-update data. For example, in the copy control session management table 402 as illustrated in FIG. 4, the copy type "SnapOPC" mapped to the copy source LU number "0" is stored.

The copy control session management table 402 includes the copy type input beforehand by the user. For example, when information for setting the copy type input by the user is transferred by the controller 500 (copy controller 501), the copy control session management table 402 reflects the transferred information and then manages the copy type. Information stored on the copy control session management table 402 is used by the determiner 503 to be discussed later.

In accordance with the first embodiment, the copy control session management table 402 stores the "copy source LU number" with a copy type other than the SnapOPC" mapped thereto. The present technique is not limited to this arrangement. For example, the "copy source LU number" may be stored with a known method such as "one point copy (OPC)" mapped thereto.

A configuration table 403 stores information related to the bad data as illustrated in FIG. 5. The bad data is unreadable data. More specifically, the bad data is data that the controller 500 (RAID controller 502) has determined as being lost and unreadable (faulty block data).

For example, the configuration table 403 stores the mapping of each copy source LU number to a "bad data logical block addressing (LBA) address" and a "bad data LBA size." The "bad data LBA address" is position information indicating the position of the bad data and the "bad data LBA size" is information indicating the size of the bad data.

As illustrated in FIG. 5 in accordance with the first embodiment, a "configuration table number" and "bad data presence identification information" mapped to each other are stored in the configuration table 403 in addition to the "copy source LU number," the "bad data LBA address," and the "bad data LBA size." The "configuration table number" identifies the mapping of the "bad data LBA address" to the "bad data LBA size" in the configuration table 403. The "bad data presence identification information" indicates whether the data is bad or not. For example, the bad data presence identification information is "1" if the data is bad, and the bad data presence identification information "0" if the data is not bad (bad data is not input).

As an example, the configuration table 403 stores bad data presence identification information "1," bad data LBA address "0x0000000000007000," and bad data LBA size "0x0000000000000010" with copy source LU number "1," and configuration table number "0" mapped thereto.

The "position information" used in the bitmap table 401 and the position information indicating the position of the bad data are briefly described below. In accordance with the first embodiment, the bitmap table 401 lists nine data units of from "No. 1" through "No. 9" as the position information. These units of position information are respectively set for nine partitions into which the copy source LU is divided, on a one data unit for one partition basis.

In accordance with the first embodiment, a start address of the bad data (bad data LBA address) and a size throughout which the bad data continues from the start address are used as the position information indicating the bad data having the size thereof. The start address herein refers to a physical address on the copy source LU.

The relationship of the "position information" with the position information indicating the position of the bad data is briefly described below. The bad data represented by the "bad data LBA address" and the "bad data LBA size" is contained in one of areas where the "position information" used in the bitmap table 401 is set.

The configuration table 403 receives information related to the bad data from the controller 500 (RAID controller 502). The information stored on the configuration table 403 is used by the controller 500 (determiner 503).

The controller 500 performs a variety of backup processes. The controller 500 includes, as elements particularly closely related to the present technique, the copy controller 501, the RAID controller 502, the determiner 503, the all-restore unit 504, the partial-restore unit 505, and the restore controller 506.

The copy controller 501 corresponds to a "copy unit" and "time point determiner" stated in the claims. The determiner 503 corresponds to a "data determiner" stated in the claims. The restore controller 506 corresponds to a "notifier" and "receiver" stated in the claims. The all-restore unit 504 and the partial-restore unit 505 correspond a "restorer" stated in the claims.

The copy controller 501 performs a backup process. Specifically, the copy controller 501 generates a snapshot. More specifically, the copy controller 501 copies the pre-update data onto the copy destination LU of the disk 302 in response to an update instruction to update the data on the backup target volume.

The copy controller 501 receives the update instruction from the host server 200. Upon receiving the update instruction, the copy controller 501 copies the pre-update data when the data on the backup target volume is to be updated subsequent to an execution of a backup operation.

For example, the user issues an SnapOPC instruction to perform a SnapOPC in step (1) in FIG. 6. In an update operation performed subsequent to the SnapOPC instruction, the copy controller 501 copies onto the copy destination LU of the disk 302 only the pre-update data at a location that has undergone the update operation, in step (2) in FIG. 6.

More in detail, when the data on the backup target volume is updated in step (3) in FIG. 6 subsequent to the SnapOPC instruction, the copy controller 501 copies only the pre-update data at the location having undergone the update operation in step (4) in FIG. 6. The copy controller 501 transfers the copied pre-update data to the copy destination LU of the disk 302 in step (4) in FIG. 6 with session information corresponding to the SnapOPC instruction in step (1) mapped to the copied pre-update data. If the update operation is performed again, the copy controller 501 copies the pre-update data at the updated location and then transfers the copied pre-update data to the copy destination LU of the disk 302 in step (5) in FIG. 6.

A plurality of update operations may be performed in response to the SnapOPC instruction. In such a case, the copy controller 501 then transfers the pre-update data at the location having undergone the update operation to the copy destination LU of the disk 302 only if pre-update data at the location having undergone the update operation has not been stored. In other words, if pre-update data at the location having undergone the update operation has been stored, the copy controller 501 does not transfer the pre-update data at the location having undergone the update operation to the copy destination LU of the disk 302 even if the update operation is performed on the same location.

The copy controller 501 receives information for setting the copy type from the host server 200 via the host adaptor 301 and transfers the received information to the copy control session management table 402.

The RAID controller 502 determines the bad data and inputs information related to the determined bad data to the configuration table 403. In other words, the RAID controller 502 periodically determines whether each data unit of the data on the backup target volume contains bad data. For example, each time the data on the backup target volume is read, the RAID controller 502 determines whether each data unit of the data on the backup target volume contains bad data.

In response to an instruction from the restore controller 506, the determiner 503 determines whether data corresponding to the bad data is present and whether the bad data is restorable. For example, when an instruction to determine restorability of the bad data is received from the restore controller 506, the determiner 503 performs the determination operation on a per position information unit basis or on a per snapshot unit basis.

The determiner 503 is described specifically. The determiner 503 determines whether data corresponding to the bad data is present. As described below, for example, the determiner 503 performs the determination operation on a per position information unit basis or on a per snapshot unit basis.

The determination operation on a per position information unit basis means a determination of whether the data indicated by the position information of the position of the bad data is restorable (whether a partial-restore operation is executable or not). The determination operation on a per snapshot unit basis means a determination of whether the snapshot is in an operatively effective state (whether an all-restore operation is executable or not). The term "operatively effective state" means that the pre-update data for all the position information indicating the bad data is backed up at a snapshot at a given time point.

The determination operation on a per position information unit basis is described below. Specifically, the determiner 503 determines each unit of the position information has the corresponding pre-update data. More specifically, the determiner 503 searches the bitmap table 401 for the position information indicating the position of the bad data. In response to the copy status managed with the position information mapped thereto, the determiner 503 determines whether the pre-update data of the bad data is stored on the copy destination LU of the disk 302.

In the discussion that follows, the copy status is managed with nine units of the position information of from "No. 1" through "No. 9" mapped thereto on each snapshot as illustrated in FIGS. 7A and 7B. With reference to FIG. 7A, the pre-update data represented by "No. 2," "No. 7," and "No. 9" is backed up by the copy controller 501 as illustrated in FIG. 7A. The bitmap table 401 stores a copy status "0" with the position information "No. 2," "No. 7," and "No. 9" mapped thereto, and a copy status "1" with other position information mapped thereto. As illustrated in FIG. 7B, it is presumed that bad data is created after the pre-update data is backed up by the copy controller 501. As previously discussed with reference to the configuration table 403, the bad data is at a position identified by the "bad data LBA address" and the "bad data LBA size." That position herein is within a range indicated by "No. 7" and "No. 8."

With reference to FIG. 7B, the determiner 503 searches the bitmap table 401 and reads a copy status "0" mapped to the position information "No. 7" stored on the bitmap table 401. The determiner 503 then determines that the pre-update data of the bad data at the location indicated by the position information "No. 7" is stored on the copy destination LU of the disk 302. The determiner 503 also determines that the pre-update data of the bad data at the location indicated by the position information "No. 8" is not stored on the copy destination LU of the disk 302.

If it is determined that the pre-update data is stored with the position information of the bad data identified by the "bad data LBA address" and the "bad data LBA size" mapped thereto, the determiner 503 determines that the data corresponding to the bad data is present. If it is determined that the pre-update data is not stored with the position information of the bad data identified by the "bad data LBA address" and the "bad data LBA size" mapped thereto, the determiner 503 determines that the data corresponding to the bad data is not present.

The determination operation on a per snapshot unit basis is described below. Specifically, the determiner 503 determines on a per snapshot unit basis (on a per session number basis) whether the pre-update data at all the position information indicating the positions of the bad data is present. More specifically, if bad data is present in the data on the backup target volume, the determiner 503 searches the bitmap table 401 for copy statuses at all the position information of the positions of the bad data. The determiner 503 then determines whether the pre-update data at all the position information indicating the bad data is stored on the copy destination LU of the disk 302. The determiner 503 also determines on a snapshot basis (on a bitmap basis with the bitmap mapped to the session number) whether the pre-update data at all the position information indicating the bad data is stored.

The case in which the bad data is contained within the range identified by "No. 7" and "No. 8" is described specifically below. For a snapshot "N," the pre-update data for the position information "No. 7" and "No. 8" is stored. For example, in a bitmap mapped to a session number "N," a copy status "0" is mapped to the position information "No. 7" and "No. 8." For a snapshot "M," the pre-update data for the position information "No. 8" only is stored. For example, in a bitmap mapped to a session number "M," a copy status "0" is mapped to only the position information "No. 8."

The determiner 503 searches the bitmap table 401 to determine on a snapshot basis whether the pre-update data is stored for each of "No. 7" and "No. 8."

For example, the determiner 503 searches the bitmap table 401 to determine on a per snapshot unit basis (on a per bitmap basis) whether the copy status "0" is stored for each of the position information "No. 7" and "No. 8." As for the snapshot "N," the determiner 503 determines that the pre-update data is stored for all the position information indicating the bad data. As for the snapshot "M," the determiner 503 determines that the pre-update data is not stored for all the position information indicating the bad data (i.e., the copy status "0" is not stored for "No. 7" and/or the copy status "0" is not stored for "No. 8").

The determiner 503 determines whether the bad data is restorable, on the basis of the determination results of whether the data corresponding to the bad data is present. More specifically, the determiner 503 determines that the bad data is restorable if it is determined that the pre-update data is stored. The determiner 503 also determines that the bad data is not restorable if it is determined that the pre-update data is not stored.

If it is determines that the pre-update data indicated by the position information of the bad data is stored, the determiner 503 determines the position information is restorable (a partial-restore operation is possible). If it is determined on a given snapshot that the pre-update data of all the position information of the bad data is stored, the determiner 503 determines that the snapshot is in an operatively effective state (determines that an all-restore operation is possible using the snapshot).

More in detail, the determiner 503 determines the position information (such as "No. 7") at the bitmap containing the bad data, based on the bad data identified by the "bad data LBA address" and the "bad data LBA size." If it is determined that the pre-update data corresponding to the determined position information at the bitmap is present, the determiner 503 determines that the bad data is restorable. If it is determined that the pre-update data corresponding to the determined position information at the bitmap is not present, the determiner 503 determines that the bad data is not restorable.

More specifically, the determiner 503 receives from the restore controller 506 the instruction to determine the restorability and the position information indicating the bad data (for example, the "bad data LBA address" and the "bad data LBA size"). In response to the received position information indicating the bad data (for example, the "bad data LBA address" and the "bad data LBA size"), the determiner 503 checks the position information (such as "No. 7") at the bitmap containing the bad data to determine whether the pre-update data mapped to the position information at the determined bitmap is present. The determiner 503 determines on a per snapshot unit basis (on a bitmap basis) whether the pre-update data is present for all the position information indicating the received bad data.

The determiner 503 transfers the determination results to the restore controller 506. Specifically, the determiner 503 transfers to the restore controller 506 the determination results of each unit of the position information indicating the bad data and the determination results of each snapshot. More specifically, the determiner 503 transfers, as information indicating the bad data, the determination results of a combination of the "copy source LU number," the "bad data LBA address" and the "bad data LBA size." Furthermore, the determiner 503 transfers, as the determination results, the "session number," "partial restorability" information indicating partial restorability, and "all restorability" information indicating all restorability.

A specific example of the determination results is described. The determiner 503 transfers the partial restorability information "restorable" with a combination of a session number "10," a copy source LU number "0," bad data LBA address "0x0000000000007000," and bad data LBA size "0x0000000000000010" mapped thereto. The determiner 503 transfers all restorability information "unrestorable" with the session number "10," and copy source LU number "0" mapped thereto.

The process of the determiner 503 will be described in detail later.

Upon receiving from the restore controller 506 an instruction to restore data on a snapshot basis, the all-restore unit 504 restores the data on a per snapshot unit basis (executes an all-restore operation). For example, the all-restore unit 504 receives the "copy source LU number" and the "session number" from the restore controller 506, and acquires the corresponding snapshot from the copy destination LU of the disk 302. The all-restore unit 504 reflects the acquired snapshot in the transferred "copy source LU number."

Upon completing the restoration of data on a snapshot basis (execution of the all-restore operation), the all-restore unit 504 transfers the restoration results to the restore controller 506. For example, if the all-restore unit 504 has successfully completed the data restoration, the all-restore unit 504 notifies the restore controller 506 of the execution of the data restoration.

Upon receiving the instruction to restore data on a per position information unit basis from the restore controller 506, the partial restore unit 505 restores data on a per position information unit basis (execution of the partial-restore operation). For example, when the "copy source LU number" and the "session number" are received from the restore controller 506, the partial-restore unit 505 acquires the pre-update data indicated by the received "position information" from the corresponding snapshot. The partial-restore unit 505 reflects the acquired pre-update data at the position indicated by the received "position information" within the range of the "copy source LU number."

The partial-restore unit 505 restores data on a per position information unit basis (executes the partial-restore operation) and then transfers the restoration results to the restore controller 506. Upon completing successfully the data restoration, the partial-restore unit 505 notifies the restore controller 506 of the execution of the data restoration.

Upon receiving an instruction from the maintenance PC 100 via the host adaptor 301, the restore controller 506 performs a process responsive to the instruction. For example, the restore controller 506 performs an operation screen display control process, a restorability determination control process, and a data restoration control process as will be described later.

The operation screen display control process is described first. Upon receiving an instruction to request an operation screen from the maintenance PC 100 via the host adaptor 301, the restore controller 506 transfers to the maintenance PC 100 via the host adaptor 301 the operation screen (maintenance screen) receiving an operation input. More specifically, in response to the reception of a command (request) to retrieve a CGI for the operation screen, the restore controller 506 transfers to the maintenance PC 100 via the host adaptor 301 the CGI program displaying the operation screen illustrated in FIG. 8.

FIG. 8 illustrates only an example of the operation screen. For example, the operation screen includes an "active maintenance" menu for selecting an active maintenance, a "bad data restorability determination" menu for selecting a determination process, a "firm registration" menu for selecting a registration of a firm, and a "firm application" menu for selecting an application of a firm. The operation screen illustrated in FIG. 8 also includes an "OK" label for executing a selected operation, and a "cancel" label for canceling the selected operation.

The restorability determination control process is described below. Upon receiving an instruction to determine restorability from the maintenance PC 100 via the host adaptor 301, the restore controller 506 transfers the received instruction to the determiner 503.

For example, the restore controller 506 receives the instruction to determine restorability and the position information indicating the bad data (for example, the "bad data LBA address" and the "bad data LBA size") from the maintenance PC 100 via the host adaptor 301. The restore controller 506 then transfers the instruction to determine restorability and the position information indicating the bad data to the determiner 503.

Upon receiving the determination results from the determiner 503, the restore controller 506 transfers the received determination results to the maintenance PC 100 via the host adaptor 301.

A specific example of the process is described below. The restore controller 506 sets in a restorability table as illustrated in FIG. 9 the determination results determined by the determiner 503 on a per position information unit basis or a snapshot unit basis. With reference to FIG. 9, the restore controller 506 sets the determination results from the determiner 503 as the restorability table. The restorability table maps the "session number," the "partial restorability," and the "all restorability" to a combination of the "copy source LU number," the "bad data LBA address" and the "bad data LBA size." The restore controller 506 transfers the set restorability table to the maintenance PC 100 via the host adaptor 301.

The data restoration control process is described below. The restore controller 506 receives a request (instruction) to restore data from the maintenance PC 100 via the host adaptor 301, and transfers the received instruction to the partial-restore unit 505 and the all-restore unit 504.

Specifically, upon receiving the instruction to restore data on a per position information unit basis from the maintenance PC 100 via the host adaptor 301, the restore controller 506 so notifies the partial-restore unit 505. More specifically, the restore controller 506 receive the "copy source LU number," the "session number," and the "position information" from the maintenance PC 100 via the host adaptor 301 and then transfers the received information to the partial-restore unit 505.

For example, upon receiving the instruction to restore data on a per snapshot unit basis (command to execute the all-restore operation) from the maintenance PC 100 via the host adaptor 301, the restore controller 506 so notifies the all-restore unit 504. More specifically, the restore controller 506 receives the "copy source LU number," and the "session number" from the maintenance PC 100 via the host adaptor 301, and transfers the received information to the all-restore unit 504.

Referring to FIG. 10, the user performs an operation to restore data on the maintenance PC 100, and an instruction to restore data is transmitted from the maintenance PC 100 via the host adaptor 301. The all-restore unit 504 and the partial-restore unit 505 are so notified.

With reference to FIG. 10, the maintenance PC 100 selects one unit of bad data to be restored, and presents a screen having a "OK" label receiving an operation to execute the data restoration and a "cancel" label that cancels the data restoration operation. If the "OK" is selected by the user, a request to restore the bad data is transferred from the maintenance PC 100 to the restore controller 506 via the host adaptor 301. The restore controller 506 notifies the partial-restore unit 505 that the data restoration is to be performed.

If the user performs an operation to execute the all-restore operation on the maintenance PC 100, a request to perform the all-restore operation is transferred from the maintenance PC 100 to the restore controller 506 via the host adaptor 301. The restore controller 506 notifies the all-restore unit 504 that the all-restore operation is to be performed.

Upon receiving the execution results from one of the all-restore unit 504 and the partial-restore unit 505, the restore controller 506 transfers the received execution results to the maintenance PC 100 via the host adaptor 301. Upon receiving a notification of the execution of the data restoration from one of the all-restore unit 504 and the partial-restore unit 505, the restore controller 506 transfers the notification to the maintenance PC 100 via the host adaptor 301.

(Process of Disk Array Apparatus)

The process of the disk array apparatus 300 is described below with reference to FIGS. 11-16. The process flow performed among the user, the maintenance PC 100 and the disk array apparatus 300 (an operation screen request process, a determination request process, an all-restore request process, and a partial-restore request process) is described first with reference to FIGS. 11-14. The determination process of the disk array apparatus 300 is then described with reference to FIGS. 15 and 16.

Figure 11:
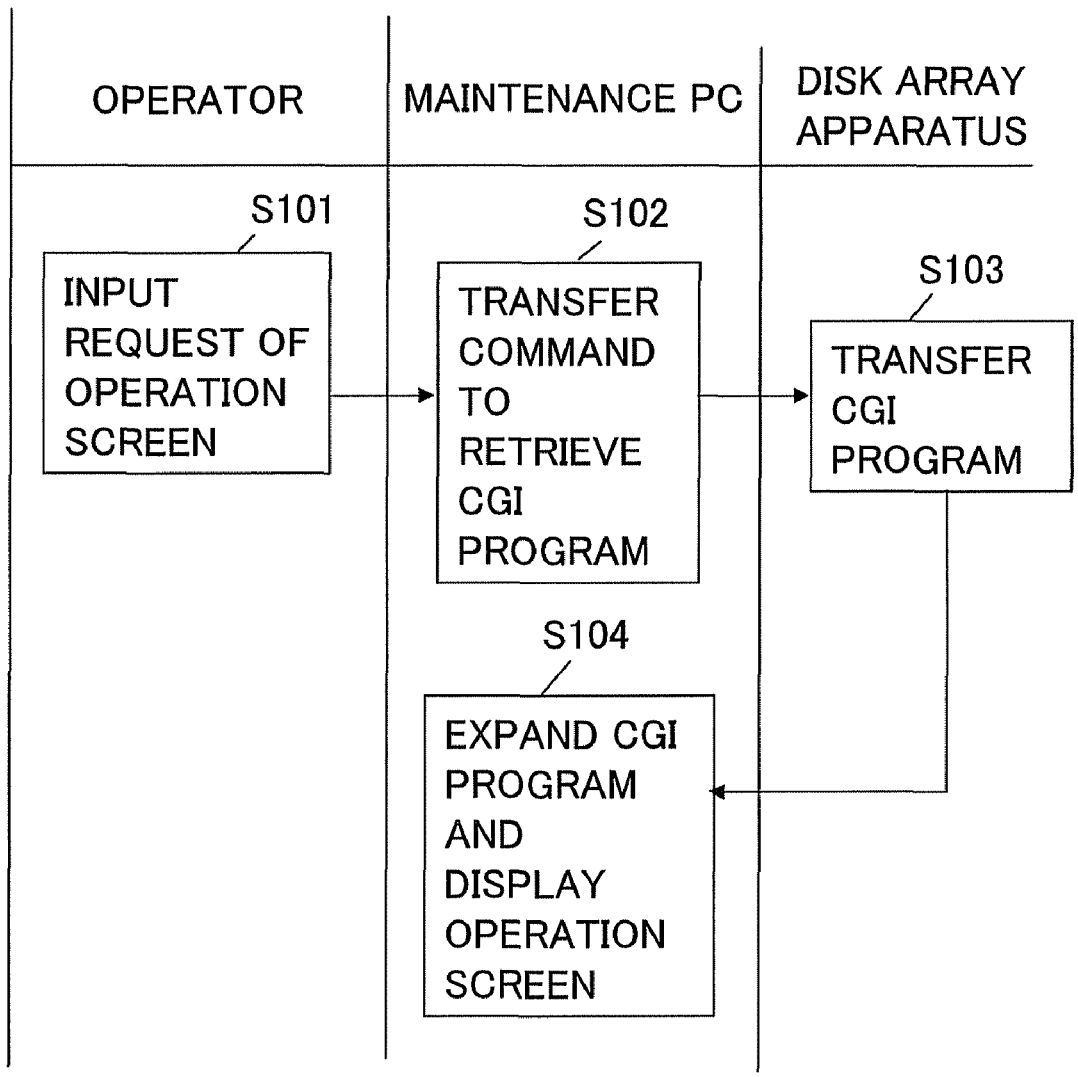
FIG. 11 is a flowchart illustrating an operation screen request process in accordance with the first embodiment.
Figure 12:
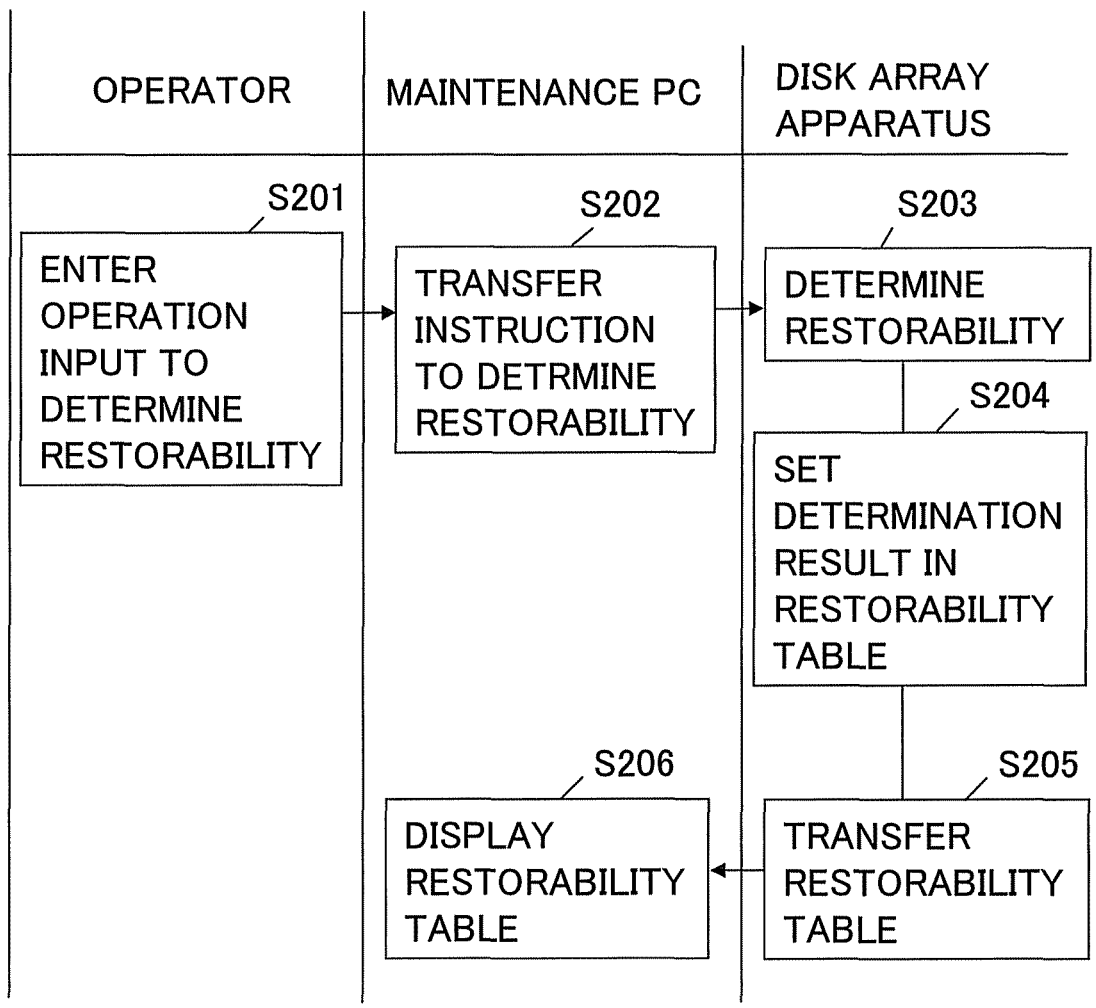
FIG. 12 is a flowchart illustrating a determination request process in accordance with the first embodiment.
Figure 13:
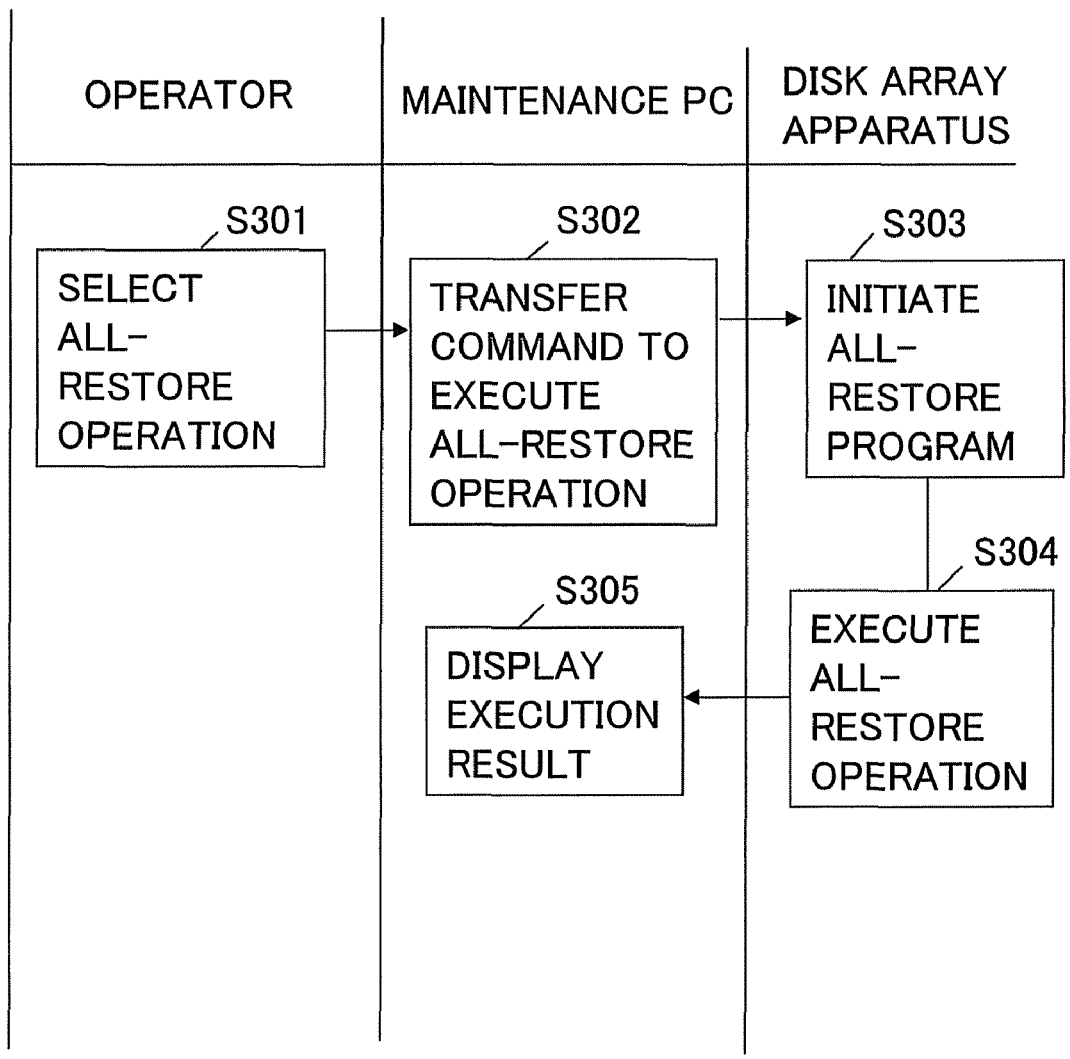
FIG. 13 is a flowchart illustrating an all-restore request process in accordance with the first embodiment.
Figure 14:
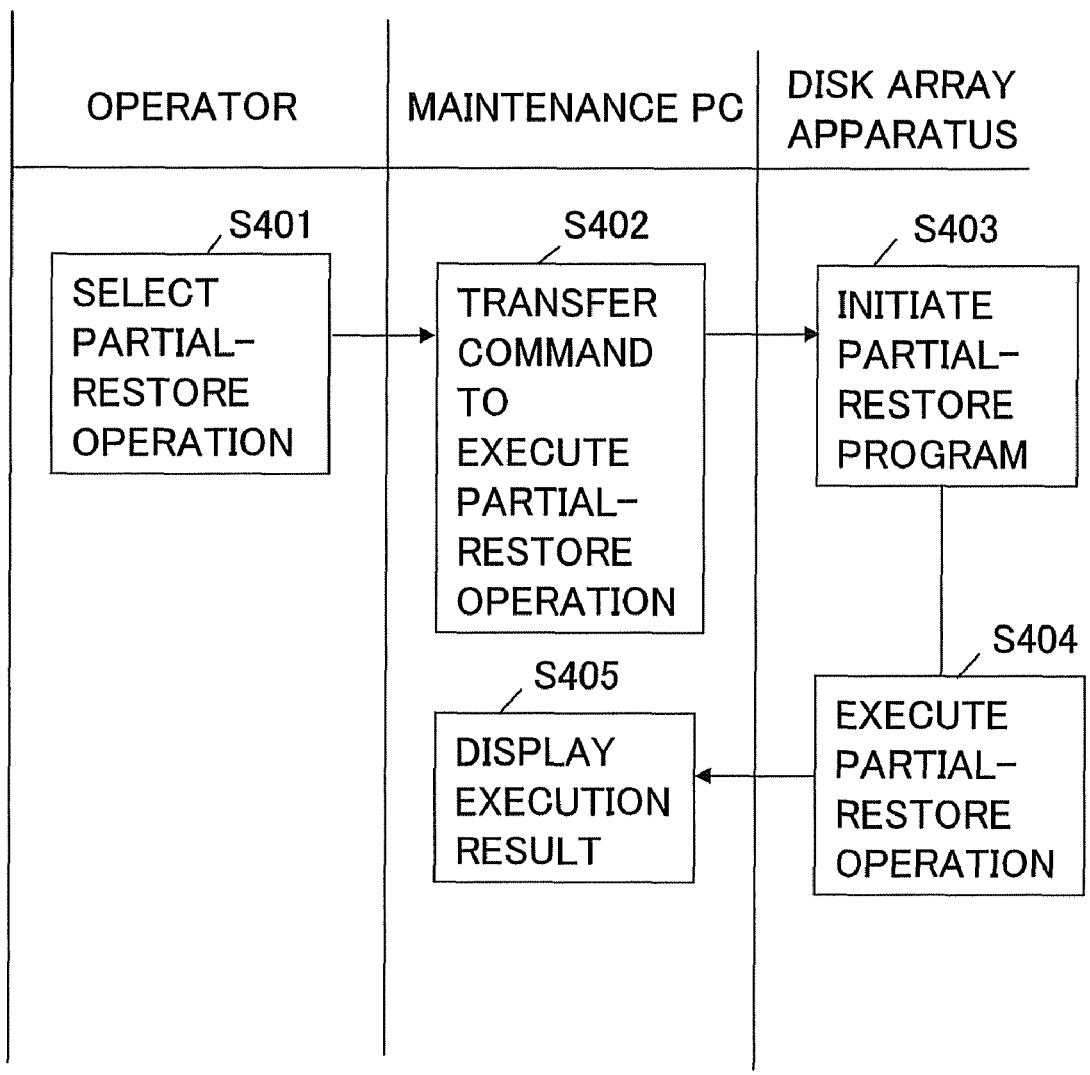
FIG. 14 is a flowchart illustrating a partial-restore request process in accordance with the first embodiment.
Figure 15A:
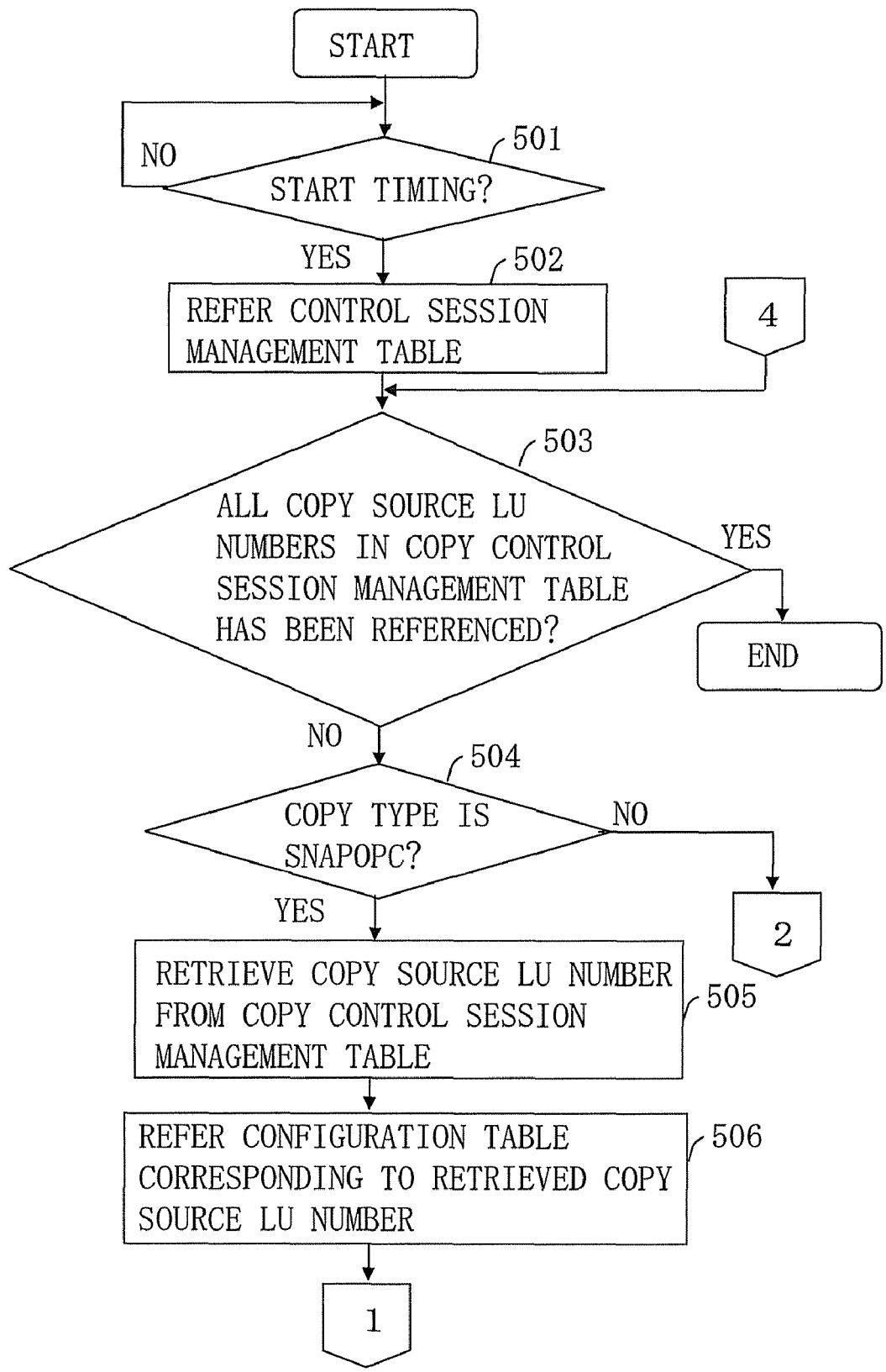
FIGS. 15A and 15B are a flowchart illustrating a determination process in accordance with the first embodiment.
Figure 15B:
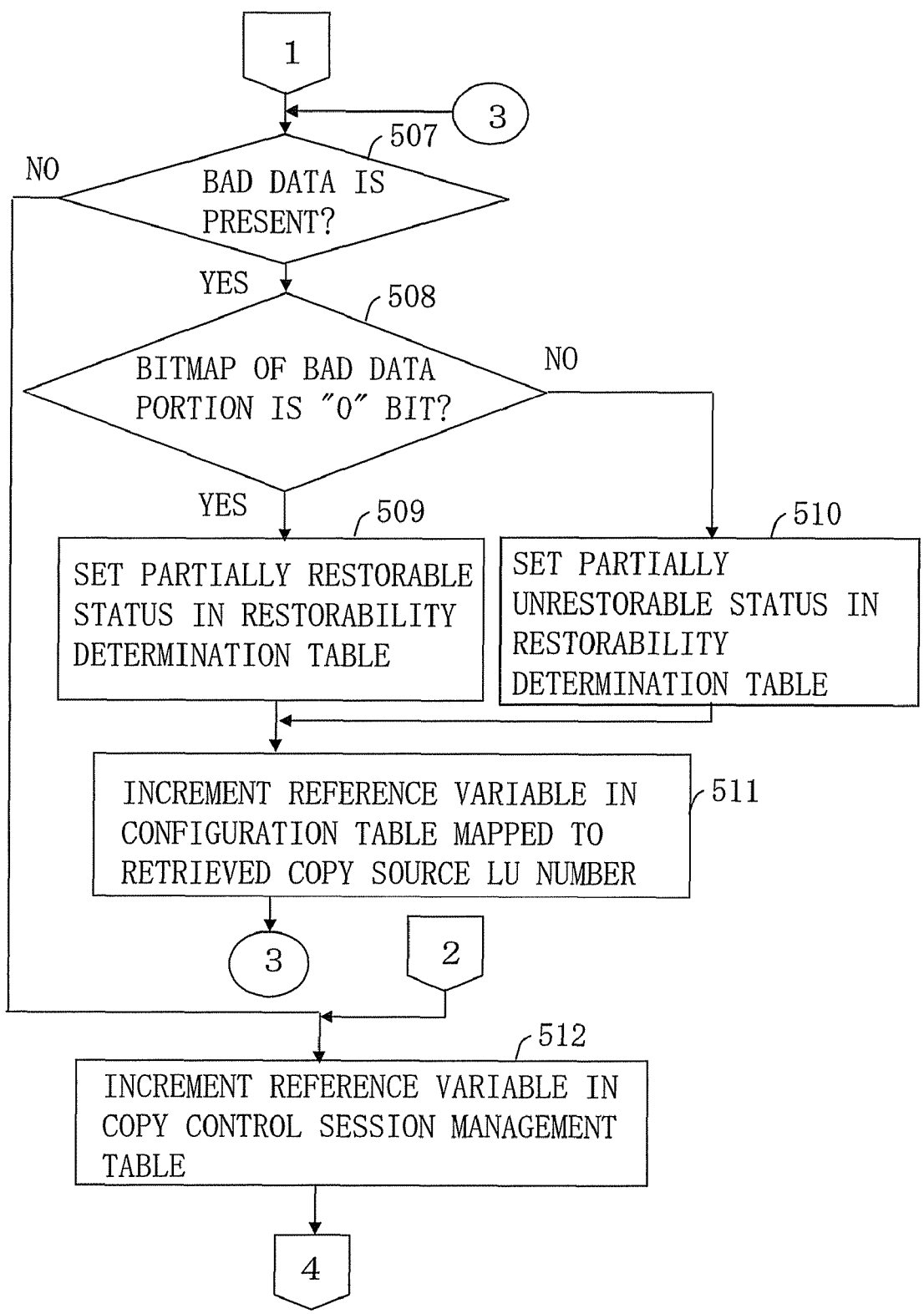
Figure 16:
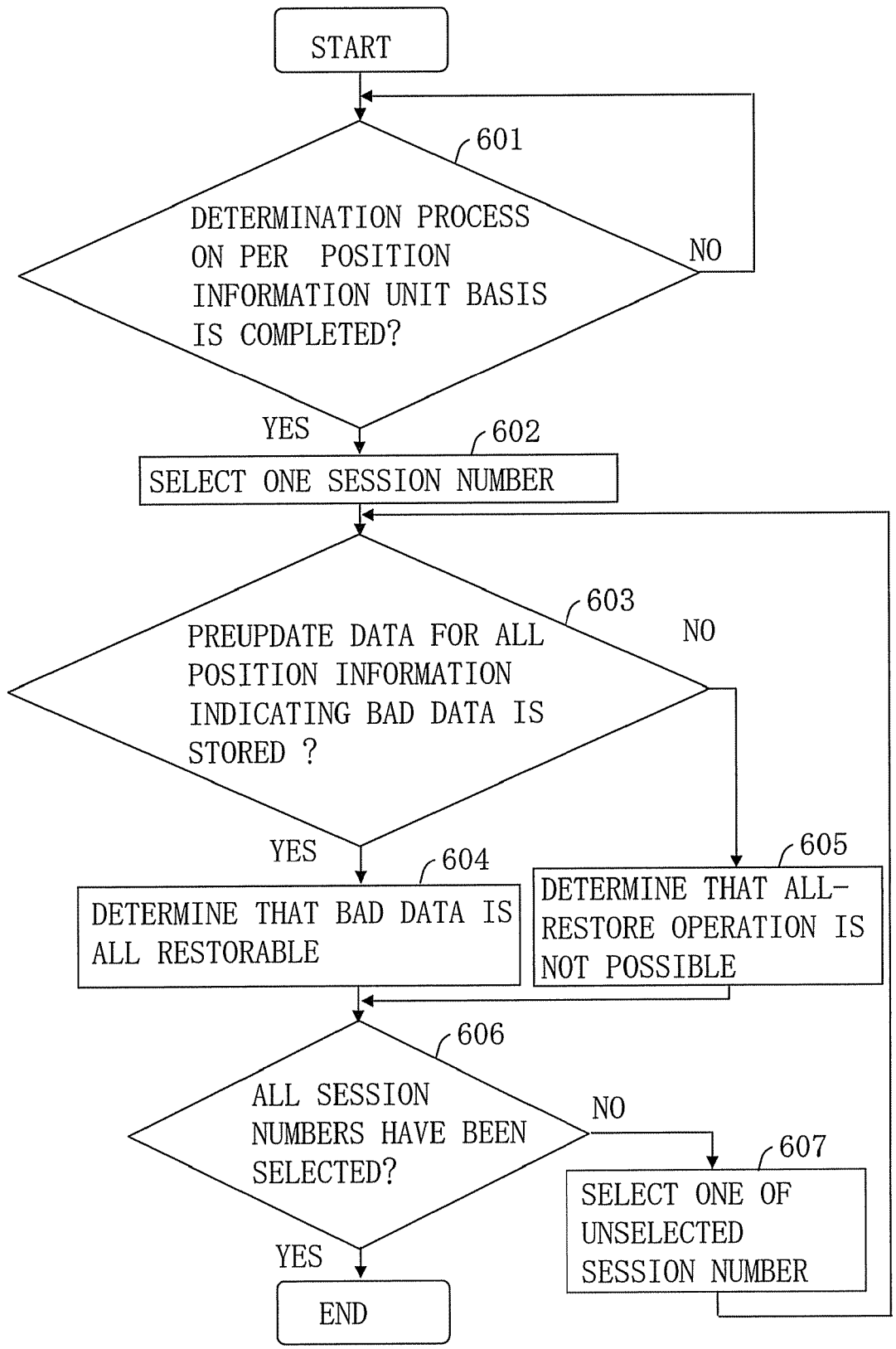
FIG. 16 is a flowchart illustrating a determination process performed on a per snapshot unit basis in accordance with the first embodiment.

FIG. 11 is a flowchart illustrating an operation screen request process in accordance with the first embodiment. FIG. 12 is a flowchart illustrating a determination request process in accordance with the first embodiment. FIG. 13 is a flowchart illustrating an all-restore request process in accordance with the first embodiment. FIG. 14 is a flowchart illustrating a partial-restore request process in accordance with the first embodiment. FIG. 15 is a flowchart illustrating a determination process in accordance with the first embodiment. FIG. 16 is a flowchart illustrating a determination process performed on a per snapshot unit basis in accordance with the first embodiment.

(Operation Screen Request Process)

The operation screen request process is described with reference to FIG. 11.

Referring to FIG. 11, an operation to request the operation screen (maintenance screen) is input to the maintenance PC 100 (step S101). For example, the operator of a browser inputs a maintenance operation login address via a keyboard. The maintenance PC 100 transfers a command to retrieve the CGI program (step S102). More specifically, the maintenance PC 100 requests the CGI program for the operation screen from the disk array apparatus 300 (restore controller 506).

The disk array apparatus 300 (restore controller 506) receives the request for the CGI program for the operation screen from the maintenance PC 100 via the host adaptor 301. The restore controller 506 transfers the CGI program to the maintenance PC 100 via the host adaptor 301 (step S103).

The maintenance PC 100 expands the CGI program transferred from the disk array apparatus 300 (restore controller 506) and then displays the operation screen on the display thereof (step S104).

(Determination Request Process)

The determination request process is described below with reference to FIG. 12.

As illustrated in FIG. 12, the user enters an operation input to determine restorability (step S201). With reference to FIG. 8, the "restorability determination" menu is selected by the user who operates the mouse, for example. The maintenance PC 100 transfers to the disk array apparatus 300 an instruction to determine restorability (step S202). If the instruction to determine restorability is not entered (selected), processing ends. For example, processing ends if the user does not enter the operation input to determine restorability but selects "cancel."

Upon receiving the instruction to determine restorability from the maintenance PC 100 via the host adaptor 301, the disk array apparatus 300 determines restorability (step S203). More specifically, in response to the instruction to determine restorability from the maintenance PC 100 via the host adaptor 301, the restore controller 506 transfers the received instruction to the determiner 503. The determiner 503 determines restorability.

The disk array apparatus 300 (restore controller 506) sets the determination results in the restorability table (step S204). The restore controller 506 transfers the restorability table to the maintenance PC 100 via the host adaptor 301 (step S205).

The maintenance PC 100 displays the received restorability table on the display thereof (step S206).

(All-Restore Request Process)

Referring to FIG. 13, the all-restore operation is selected (step S301). In other words, the user inputs an instruction to execute the all-restore operation onto the maintenance PC 100. The maintenance PC 100 transfers a command to execute the all-restore operation to the disk array apparatus 300 (step S302). If the all-restore operation is not selected on the maintenance PC 100, processing ends.

Upon receiving the command to execute the all-restore operation via the host adaptor 301, the disk array apparatus 300 (restore controller 506) initiates an all-restore program (step S303) and executes the all-restore operation (step S304). More specifically, the restore controller 506 transfers the command to execute the all-restore operation to the all-restore unit 504 and the all-restore unit 504 then executes the all-restore operation. The all-restore unit 504 transfers the execution results to the restore controller 506 and the restore controller 506 transfers the execution results to the maintenance PC 100.

The maintenance PC 100 displays the execution results (step S305). More specifically, the maintenance PC 100 displays the execution results received from the restore controller 506 via the host adaptor 301.

(Partial-Restore Request Process)

Referring to FIG. 14, the partial-restore operation is selected (step S401). More specifically, the user enters an instruction to execute the partial-restore operation. The maintenance PC 100 transfers a command to execute the partial-restore operation to the disk array apparatus 300 (step S402). If the partial-restore operation is not selected on the maintenance PC 100, processing ends.

Upon receiving the command to execute the partial-restore operation via the host adaptor 301, the disk array apparatus 300 (restore controller 506) initiates a partial-restore program (step S403) and executes the partial-restore operation (step S404). More specifically, the restore controller 506 transfers the command to execute the partial-restore operation to the partial-restore unit 505, and the partial-restore unit 505 executes the partial-restore operation. The partial-restore unit 505 transfers the execution results to the restore controller 506. The restore controller 506 transfers the execution results to the maintenance PC 100 via the host adaptor 301.

The maintenance PC 100 displays the execution results (step S405). More specifically, the maintenance PC 100 displays the execution results received from the restore controller 506 via the host adaptor 301.

(Determination Process on a Per Position Information Unit Basis)

Referring to FIG. 15, when it is a determination start timing (yes in step S501), i.e., when the restore controller 506 notifies the determiner 503 that the restorability determination process has been performed, the determiner 503 in the disk array apparatus 300 refers the copy control session management table 402 (step S502). For example, the determiner 503 initializes a reference variable (such as a number) (for example, to zero), and then selects a number. More specifically, the determiner 503 selects the smallest one from among the copy source LU numbers stored in the copy control session management table 402.

The determiner 503 determines whether all the copy source LU numbers stored in the copy control session management table 402 have been referenced (step S503). For example, the determiner 503 determines whether the copy source LU number selected is present. If it is determined that all the numbers have been referenced (yes in step S503), processing ends.

If it is determined that all the numbers have not been referenced (no in step S503), the determiner 503 determines whether the "copy type" is "SnapOPC" (step S504). In other words, the determiner 503 determines whether the "copy type" mapped to the selected copy source LU number is "SnapOPC." If it is determined that the copy type is "SnapOPC" (yes in step S504), the determiner 503 retrieves (reads) the selected copy source LU number from the copy control session management table 402 (step S505).

The determiner 503 refers the configuration table 403 corresponding to the retrieved "copy source LU number" (step S506). For example, the determiner 503 initializes a reference variable (such as a number) (to zero), and selects a number in the configuration table 403. More specifically, the determiner 503 selects the smallest one from among the "configuration table numbers" mapped to the retrieved copy source LU number in the configuration table 403.

The determiner 503 determines whether bad data is present (step S507). For example, the determiner 503 determines whether a "bad data number" mapped to the selected "configuration table number" is "0" or "1." If it is determined that bad data is present (yes in step S507), the determiner 503 determines whether a bitmap of the bad data portion is a "0" bit (step S508). More specifically, the determiner 503 determines whether the pre-update data of the bad data is stored. More in detail, the determiner 503 determines whether "0" is stored in the bitmap table 401 mapped to the position information corresponding to the "bad data LBA address" and the "bad data LBA size" of the "configuration table number."

When it is determined whether the pre-update data of the bad data is stored, the determiner 503 performs the determination process on all the snapshots (of the bitmap). For example, if session numbers of from "1" through "11" are present (ten snapshots are present) with the "copy source LU numbers" mapped thereto, the determiner 503 determines on all the bitmaps respectively produced for the session numbers "1" through "11" whether the pre-update data of the bad data is stored.

If it is determined that the bit is "0" (yes in step S508), the determiner 503 notifies the restore controller 506 that the bad data is "partially restorable," and the restore controller 506 sets a partially restorable status in a restorability determination table (step S509). In other words, the restore controller 506 sets the results of bad data as being restorable.

If it is determined that the bit is not "0" (no in step S508), the determiner 503 notifies the restore controller 506 that the bad data is not partially restorable. The restore controller 506 sets a partially unrestorable status in the restorability determination table (step S510). In other words, the restore controller 506 sets the results of bad data as being unrestorable.

The determiner 503 increments the reference variable by one in the configuration table 403 mapped to the retrieved copy source LU number (step S511). The determiner 503 repeats the above-described process (steps S507-S511) until the determiner 503 determines that no bad data is present.

If it is determined in step S504 that the "copy type" is not "SnapOPC" (no in step S504) or if it is determined in step S507 that no bad data is present (no in step S507), the determiner 503 increments the reference variable by one in the copy control session management table 402 (step S512). The determiner 503 performs the above-described process (steps S504-S512) until it is determined in step S503 that all the copy control session management table 402 has been referenced.

If it is determined in step S503 that all the copy control session management table 402 has been referenced (yes in step S503), the determiner 503 completes the process.
(Determination Process on a Snapshot Basis)

Referring to FIG. 16, the determiner 503 determines whether the determination process on a per position information unit basis is completed (step S601). For example, the determiner 503 determines whether the process illustrated in FIG. 15 is completed. If it is determined that the determination process on a per position information unit basis is completed (yes in step S601), the determiner 503 selects one session number (step S602). More specifically, the determiner 503 selects a "session number" mapped to the copy source LU number to be determined.

The determiner 503 determines whether the pre-update data for all the position information indicating the bad data is stored in the snapshot of the session number (step S603). If it is determined that the pre-update data for all the position information indicating the bad data is stored (yes in step S603), the determiner 503 determines that the bad data is all restorable (step S604). If it is determined that the pre-update data for all the position information indicating the bad data is not stored (no in step S603), the determiner 503 determines the all-restore operation is not possible (step S605).

The determiner 503 determines whether all the session numbers have been selected (step S606). If it is determined that not all the session numbers have been selected (no in step S606), the determiner 503 selects one of the unselected session numbers (step S607). The determiner 503 repeats steps S603-S606 until the determiner 503 determines that all the session numbers have been selected.

If it is determined that all the session numbers have been selected (yes in step S606), processing ends.

Advantages of the First Embodiment

In accordance with the first embodiment, the pre-update data is copied onto the disk 302 in response to the update instruction to update the data on the backup target volume. Each unit of the data on the backup target volume is mapped to the position information indicating the position of each unit of the data on the backup target volume. The copy status indicating whether the pre-update data indicated by the position information is stored or not is managed. If bad data is present in the data on the backup target volume, the position information indicating the position of the bad data is searched in the bitmap table 401. A determination as to whether the pre-update data of the bad data is stored or not is made in accordance with the copy status managed with the bad data mapped thereto. The disk array apparatus can thus easily learn whether the backup data at the location having the bad data is present.

In accordance with the first embodiment, the determination results are transferred to the maintenance PC 100 managing the copy control apparatus and the maintenance PC 100 then displays the received determination results. The user works with the maintenance PC 100 while monitoring the determination results on the display.

In accordance with the first embodiment, a determination as to whether the pre-update data is stored on the disk 302 is performed on a per position information unit basis of the position information indicating the position of the bad data. If the bad data is present in the data on the backup target volume, the position information indicating the position of the bad data is searched in the bitmap table 401. A determination as to whether the pre-update data of the bad data is stored on the disk 302 is performed on all the position information indicating data fault locations at each time point in accordance with the copy status managed with the position information mapped thereto. In accordance with the first embodiment, the disk array apparatus can easily determine whether the all-restore operation or the partial-restore operation can be performed.

In accordance with the first embodiment, the instruction to restore data on a per position information unit basis or the instruction to restore data on a per snapshot unit basis is received. If the instruction to restore data on a per position information unit basis is received, the data restoration process is performed a per position information unit basis. If the instruction to restore data on a per snapshot unit basis is received, the data restoration process is performed on a per snapshot unit basis. One of the partial-restore operation and the all-restore operation is easily performed.

Second Embodiment

The present technique is not limited to the first embodiment. The present technique may be implemented in a different embodiment. Other embodiments are described below.
(Determination)

In accordance with the first embodiment, the disk array apparatus 300 performs the determination process in response to the instruction from the maintenance PC 100. The present technique is not limited to such an arrangement. For example, the disk array apparatus 300 determines periodically the determination process and notifies the maintenance PC 100 of the determination results. For example, if the RAID controller 502 identifies new bad data, the disk array apparatus 300 performs the determination process on the new bad data and notifies the maintenance PC 100 of the determination results.
(Detection of Bad Data)

In accordance with the first embodiment, the bad data is detected at regular intervals. The present technique is not limited to such an arrangement. For example, the determination process may be performed each time the maintenance PC 100 transfers the instruction from the user. The determination process may be performed each time the host server 200 accesses the disk array apparatus 300.
(Procedure of the Determination Process)

The determination process is performed on a per position information unit basis, and then performed on a per snapshot unit basis (as illustrated in FIG. 16). The present technique is not limited to such an arrangement. The determination process on a per position information unit basis and the determination process on a per snapshot unit basis may be performed separately.

Combination of the Embodiments

In accordance with the first embodiment, process steps of (1) determining whether the pre-update data of the bad data is backed up, (2) notifying of determination results, (3) determining whether the partial-restore operation or the all-restore operation can be performed, and (4) receiving the instruction to perform the partial-restore operation and the instruction to perform the all-restore operation are performed in combination. The present technique is not limited to such an arrangement. It is perfectly acceptable if at least one of the above process steps (1)-(4) is performed.

(System Configuration)

Information related to the process steps, control steps, specific names of the elements, the variety of data, and the variety of parameters discussed above with reference to the drawings (FIGS. 1-15) may be changed unless otherwise so stated.

The elements in the apparatuses described above are illustrated in the drawings from the standpoint of function and concept thereof, and not necessarily physically arranged as illustrated. The actual distribution and integration of each apparatus are not limited to those illustrated in the drawings. Each apparatus in part or whole may be distributed or integrated functionally or physically by appropriate unit. In the example illustrated in FIG. 2, the disk 302 may be divided between the copy source LU and the copy destination LU.

(Program)

Figure 17:
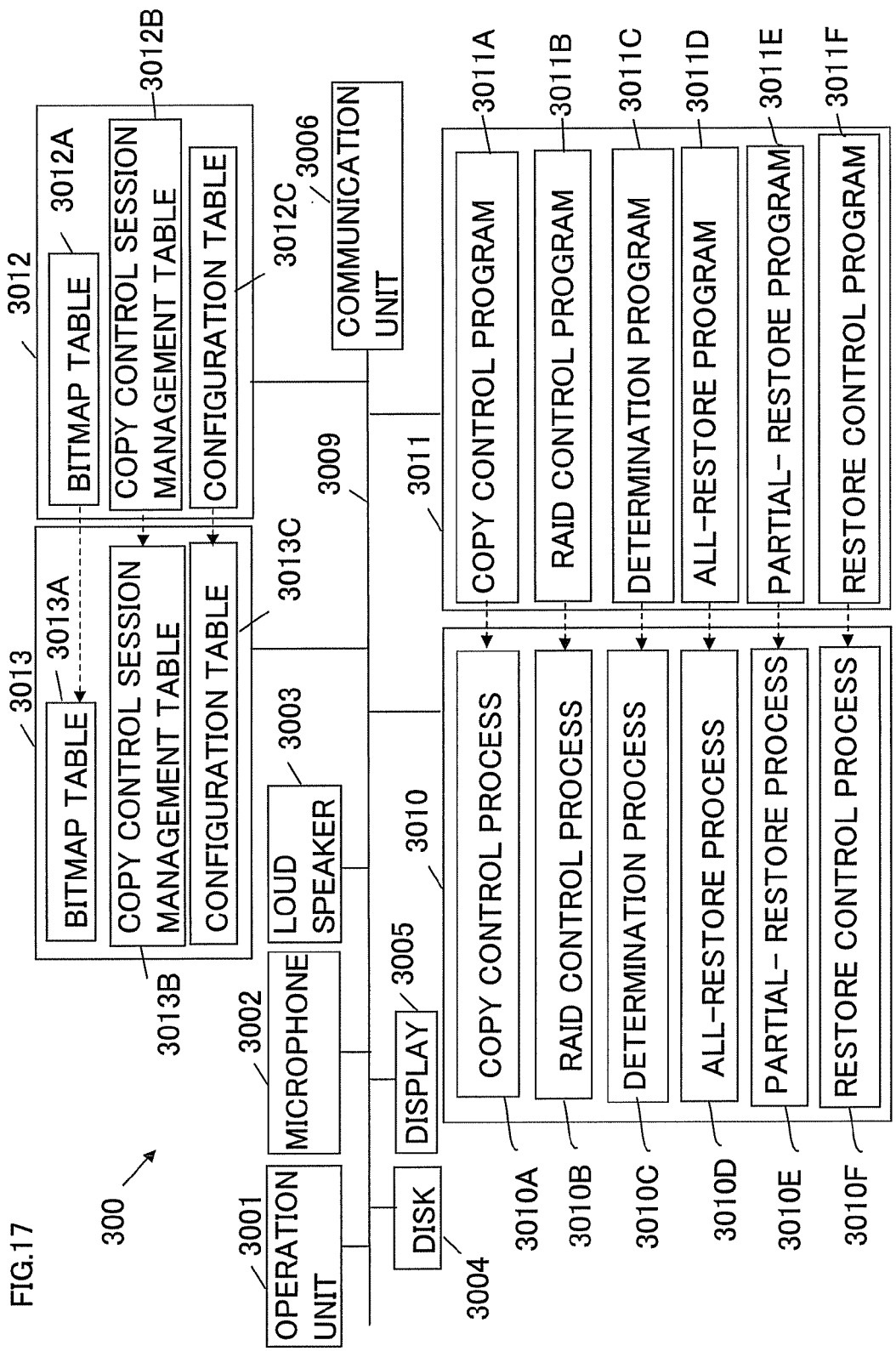
FIG. 17 illustrates a program of the disk array apparatus in accordance with the first embodiment.

In accordance with the first embodiment, the variety of processes described above are executed using hardware logic. The present technique is not limited to this arrangement. The variety of processes described above may be executed by causing a computer to execute a prepared program. A computer executing the program having the same function as the disk array apparatus 300 of the first embodiment is described below with reference to FIG. 17. FIG. 17 illustrates the program of the disk array apparatus 300 of the first embodiment.

Referring to FIG. 17, a disk array apparatus 3000 of the first embodiment includes an operation unit 3001, a microphone 3002, a loudspeaker 3003, a disk 3004, a display 3005, a communication unit 3006, a CPU 3010, an ROM 3011, an HDD 3012, an RAM 3013, and a bus 3009 interconnecting these elements.

The ROM 3011 pre-stores control programs having the same function as the copy controller 501, the RAID controller 502, the determiner 503, the all-restore unit 504, the partial-restore unit 505, and the restore controller 506, all these elements illustrated in FIG. 1. More specifically, the ROM 3011 pre-stores a copy control program 3011A, a RAID control program 3011B, a determination program 3011C, an all-restore program 3011D, a partial-restore program 3011E, and a restore control program 3011F as illustrated in FIG. 17. These programs 3011A-3011F may be distributed or integrated as the elements of the disk array apparatus 300 illustrated in FIG. 2.

When the CPU 3010 reads the programs 3011A-3011F from the ROM 3011 and executes the read programs 3011A-3011F, the programs 3011A-3011F respectively function as a copy control process 3010A, a RAID control process 3010B, a determination process 3010C, an all-restore process 3010D, a partial-restore process 3010E, and a restore control process 3010F. The processes 3010A-3010F respectively correspond to the copy controller 501, the RAID controller 502, the determiner 503, the all-restore unit 504, the partial-restore unit 505, and the restore controller 506 illustrated in FIG. 2.

The HDD 3012 includes a bitmap table 3012A, a copy control session management table 3012B, and a configuration table 3012C. The tables 3012A-3012C respectively correspond to the bitmap table 401, the copy control session management table 402, and the configuration table 403 illustrated in FIG. 2.

The CPU 3010 reads the bitmap table 3012A, the copy control session management table 3012B, and the configuration table 3012C and stores the read tables onto the RAM 3013. Using the copy control session management table 3012B, and the configuration table 3012C stored on the RAM 3013, the CPU 3010 executes the program of the disk array apparatus 300.

Alternative Embodiments

The disk array apparatus 300 described above is implemented by causing a computer, such as a personal computer or a workstation, to execute the prepared program. The program may be delivered via a network such as the Internet. The program may be stored onto a computer readable recording medium such as a hard disk, a flexible disk (FD), a compact-disk ROM (CD-ROM), a magneto-optical disk (MO), or a digital versatile disk (DVD), and then the computer may read the program from the recording medium to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A copy controlling apparatus to produce a snapshot indicating a backup target volume at a time point of an execution of a backup operation each time the backup operation is performed, the copy controlling apparatus comprising:

a copy unit configured to copy pre-update data on the backup target volume in a first storage device into a second storage device on the basis of an update instruction upon receiving the update instruction of data in the backup target volume in the first storage device subsequent to the time point of the execution of the backup operation;

a memory configured to store a management table configured to relate a copy status with position information indicating a position of the data in the backup target volume at each time point, the copy status indicating whether the pre-update data indicated by the position information is copied into the second storage device by the copy unit;

a data determiner configured to search the position information indicating the position of bad data indicating unreadable data using the management table upon the bad data being present in the backup target volume, and to determine on each of the position information indicating the position of the bad data whether the pre-update data corresponding to the bad data is stored in the second storage device on the basis of the copy status related with the position information; and a time point determiner configured to search the management table for the position information indicating the position of the bad data when the bad data is present in the backup target volume, and to determine at each time point in accordance with the copy status related with the position information whether the pre-update data of the bad data is stored in the second storage device with respect to all the position information indicating the bad data.

2. The apparatus according to claim 1, further including a notifier for notifying a management device for managing the copy controlling apparatus of the determination results of the data determiner and time point determiner.

3. The apparatus according to claim 1, further including a receiver for receiving an instruction to perform a data restoration operation on a per position information unit basis and an instruction to perform the data restoration operation on a per snapshot unit basis, and a restorer for performing the data restoration operation on a per position information unit basis when the receiver receives the instruction to perform the data restoration operation on a per position information unit basis and performing the data restoration operation on a per snapshot unit basis when the receiver receives the instruction to perform the data restoration operation on a per snapshot unit basis.

4. A copy controlling method to produce a snapshot indicating a backup target volume at a time point of an execution of a backup operation each time the backup operation is executed, the copy controlling method comprising:

copying pre-update data on the backup target volume in a first storage device to a second storage device on the basis of update instruction upon receiving the update instruction of data on the backup target volume in the first storage device subsequent to the time point of the execution of the backup operation;

managing a management table configured to relate a copy status with position information indicating a position of the data in the backup target volume at each time point, the copy status indicating whether the pre-update data indicated by the position information is copied into the second storage device by the copy unit;

searching the position information indicating the position of bad data indicating unreadable data using the management table upon the bad data being present in the backup target volume;

determining on each of the position information indicating the position of the bad data whether the pre-update data corresponding to the bad data is stored in the second storage device on the basis of the copy status related with the position information;

searching the management table for the position information indicating the position of the bad data when the bad data is present in the backup target volume; and determining at each time point in accordance with the copy status related with the position information whether the pre-update data of the bad data is stored in the second storage device with respect to all the position information indicating the bad data.

5. The method according to claim 4, further including:

notifying a management device managing a copy apparatus for performing the copy controlling method of the determination results determined by the determining steps.

6. The method according to claim 4, further including:

receiving an instruction to perform a data restoration operation on a per position information unit basis and an instruction to perform the data restoration operation on a per snapshot unit basis, and performing the data restoration operation on a per position information unit basis if the instruction to perform the data restoration operation on a per position information unit basis is received and performing the data restoration operation on a per snapshot unit basis if the instruction to perform the data restoration operation on a per snapshot unit basis is received.

* * * * *

UNITED STATES PATENT AND TRADEMARK OFFICE
CERTIFICATE OF CORRECTION

| | |
|---|---|
| PATENT NO. | : 8,112,598 B2 |
| APPLICATION NO. | : 12/372889 |
| DATED | : February 7, 2012 |
| INVENTOR(S) | : Takashi Kawada et al. |

It is certified that error appears in the above-identified patent and that said Letters Patent is hereby corrected as shown below:

Column 22, Line 13, In Claim 5, after "copy" insert -- controlling --.

Signed and Sealed this
Fifteenth Day of May, 2012

David J. Kappos
*Director of the United States Patent and Trademark Office*